US012416409B2

(12) United States Patent
Naik et al.

(10) Patent No.: US 12,416,409 B2
(45) Date of Patent: Sep. 16, 2025

(54) GAS TURBINE ENGINE HAVING A COMBUSTION SECTION WITH STEAM PROVIDED TO SECOND COMBUSTOR PLENUM

(71) Applicant: General Electric Company, Schenectady, NY (US)

(72) Inventors: Pradeep Naik, Bengaluru (IN); Clayton S. Cooper, Loveland, OH (US); Steven C. Vise, Loveland, OH (US); Michael A. Benjamin, Cincinnati, OH (US); Sibtosh Pal, Mason, OH (US); Steven Marakovits, Mason, OH (US); Sripathi Mohan, Bengaluru (IN); Joseph Zelina, Waynesville, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/436,180

(22) Filed: Feb. 8, 2024

(65) Prior Publication Data

US 2025/0257872 A1 Aug. 14, 2025

(51) Int. Cl.
*F23R 3/28* (2006.01)
*F02C 3/14* (2006.01)
*F02C 3/30* (2006.01)
*F02C 6/18* (2006.01)
*F02C 7/047* (2006.01)
*F02C 7/141* (2006.01)
(Continued)

(52) U.S. Cl.
CPC .................. *F23R 3/28* (2013.01); *F02C 3/14* (2013.01); *F02C 3/30* (2013.01); *F02C 3/305* (2013.01);
(Continued)

(58) Field of Classification Search
CPC ..... F23R 3/002; F23R 3/04; F23R 3/16; F23R 3/28; F23R 3/34; F23R 3/346; F23R 3/42;
(Continued)

(56) References Cited

U.S. PATENT DOCUMENTS

| 4,192,139 A | 3/1980 | Buchheim |
| 5,896,740 A * | 4/1999 | Shouman ............... F01K 21/042 60/39.55 |

(Continued)

OTHER PUBLICATIONS

Naik, et al., U.S. Appl. No. 18/453,500, filed Aug. 22, 2023.
(Continued)

*Primary Examiner* — Kyle Robert Thomas
(74) *Attorney, Agent, or Firm* — Venable LLP; Edward A. Kmett; Michele V. Frank

(57) ABSTRACT

A gas turbine engine includes a steam generating system, and a combustion section having a first combustor and a second combustor in fluid communication with a secondary combustion zone of the first combustor. The second combustor is operable to receive compressor bleed air and fuel, along with steam from the steam generating system. During a non-idle operating state and a power-augmentation operating state, when the steam system is operable, steam is provided to the second combustor and then to the secondary combustion zone of the first combustor. When the steam generating system is inoperable, the fuel and bleed air are provided to the second combustor and combusted, and combustion products are provided to the first combustor. When the steam generating system is partially operable, the steam, the bleed air, and the fuel are provided to the second combustor, and combustion products are provided to the first combustor.

20 Claims, 12 Drawing Sheets

(51) Int. Cl.
  *F02C 7/143* (2006.01)
  *F02C 9/18* (2006.01)
  *F23R 3/00* (2006.01)
  *F23R 3/04* (2006.01)
  *F23R 3/16* (2006.01)
  *F23R 3/34* (2006.01)
  *F23R 3/42* (2006.01)
  *F23R 3/50* (2006.01)

(52) U.S. Cl.
  CPC ............... *F02C 6/18* (2013.01); *F02C 7/047* (2013.01); *F02C 7/141* (2013.01); *F02C 7/1435* (2013.01); *F02C 9/18* (2013.01); *F23R 3/002* (2013.01); *F23R 3/04* (2013.01); *F23R 3/16* (2013.01); *F23R 3/34* (2013.01); *F23R 3/346* (2013.01); *F23R 3/42* (2013.01); *F23R 3/50* (2013.01); *F05D 2220/72* (2013.01)

(58) Field of Classification Search
  CPC ...... F23R 3/50; F02C 3/14; F02C 3/30; F02C 3/305; F02C 7/047; F02C 7/141; F02C 7/1435; F02C 6/18; F02C 9/18
  See application file for complete search history.

(56) References Cited

U.S. PATENT DOCUMENTS

| | | | |
|---|---|---|---|
| 7,568,343 B2 | 8/2009 | Harris et al. | |
| 7,707,836 B1 | 5/2010 | Barnes et al. | |
| 9,068,751 B2 | 6/2015 | Snyder | |
| 9,080,772 B2* | 7/2015 | Prociw | F23R 3/20 |
| 9,228,499 B2 | 1/2016 | Stryapunin | |
| 10,222,066 B2 | 3/2019 | Chen et al. | |
| 10,436,450 B2 | 10/2019 | Crawley et al. | |
| 10,907,834 B2* | 2/2021 | Park | F02C 7/262 |
| 11,313,561 B2 | 4/2022 | Roh | |
| 11,371,710 B2 | 6/2022 | Bulat | |
| 11,415,059 B2* | 8/2022 | Ryon | F23R 3/50 |
| 2019/0162414 A1 | 5/2019 | Ogata et al. | |

OTHER PUBLICATIONS

Naik, et al., U.S. Appl. No. 18/453,506, filed Aug. 22, 2023.
Naik, et al., U.S. Appl. No. 18/497,199, filed Oct. 30, 2023.
Vukanti, et al., U.S. Appl. No. 18/501,484, filed Nov. 3, 2023.
Naik, et al., U.S. Appl. No. 18/503,751, filed Nov. 7, 2023.

* cited by examiner

FIG. 2

GAS TURBINE ENGINE HAVING A COMBUSTION SECTION WITH STEAM PROVIDED TO SECOND COMBUSTOR PLENUM

TECHNICAL FIELD

The present disclosure relates to a gas turbine engine having a combustion section.

BACKGROUND

Gas turbine engines generally include a combustor having a swirler that provides a flow of swirled air mixed with fuel into a combustion chamber, where the fuel and air mixture is ignited and burned. The burning of the fuel and air mixture in the combustion chamber results in carbon monoxide (CO) and nitrous oxide (NOx) emissions from the combustor. One technique to attempt to reduce the CO and the NOx emissions is to inject steam or water directly into the swirler via, for example, a fuel nozzle, to mix with the fuel and air mixture.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 2 is a schematic diagram of the high by-pass turbofan jet engine and the steam generating system of FIG. 1, according to an aspect of the present disclosure.

DETAILED DESCRIPTION

Figure 1:
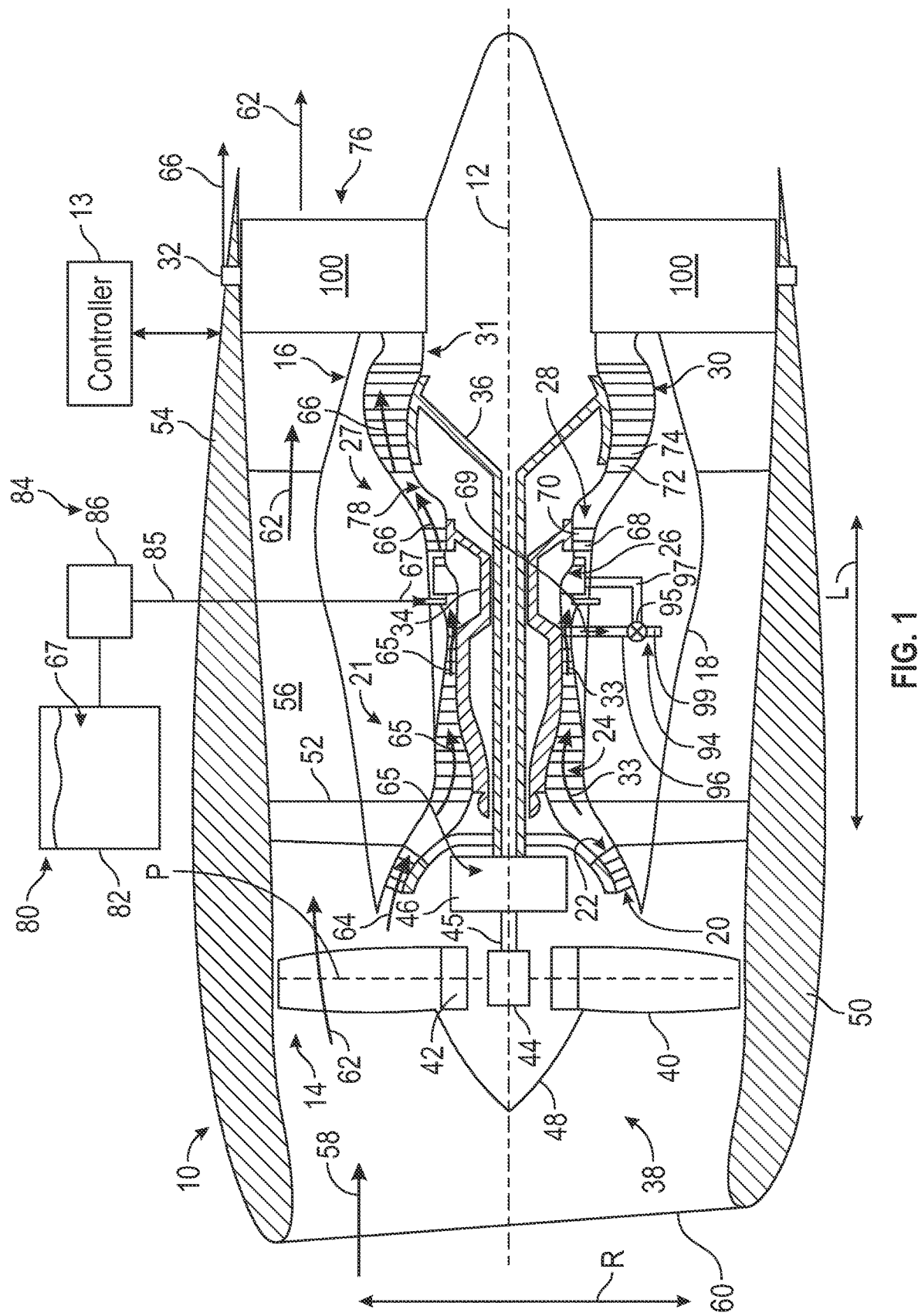
FIG. 1 is a schematic partial cross-sectional side view of an exemplary high by-pass turbofan jet engine and a steam generating system, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the aircraft gas turbine engine. Moreover, the terms "radial" and "radially" refer to directions and orientations that extend substantially perpendicular to the centerline of the aircraft gas turbine engine. In addition, as used herein, the terms "circumferential" and "circumferentially" refer to directions and orientations that extend arcuately about the centerline of the turbine engine.

As used herein, "top" refers to a highest or uppermost point, portion, or surface of a component in the orientations shown in the figures.

As used herein, "bottom" refers to a lowest or lowermost point, portion, or surface of a component in the orientations shown in the figures.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

A mission cycle for a turbine engine includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb.

As used herein, the term "idle operating state" refers to an operating state of the gas turbine engine during engine start and operation of the turbine engine at a power level of less than ten percent of the full power level capability of the turbine engine. For example, the idle operating state may be operating the turbine engine after initial start of the engine while an aircraft is stationed at an airport gate or is waiting to commence taxiing. The idle operating state may also be operating the turbine engine after arriving at the airport gate prior to shut down, or while the aircraft is sitting stationary waiting to commence taxiing to the airport gate at the end of a flight.

As used herein, the term "non-idle operating state" refers to an operating state of the turbine engine that is greater than ten percent or less than about thirty percent of the full power level capability of the turbine engine. For example, the non-idle operating state includes any of the foregoing low-power operations other than engine start and idle (e.g., includes approach when greater than ten percent or less than about thirty percent of the full power level capability), any of the mid-level power operations, or of the high-power operations. While the foregoing refers to taxiing, approach, cruise, takeoff and climb, such operations are generally applicable to the turbine engine being installed on an aircraft, and operated during a flight of the aircraft on which the turbine engine is mounted. However, the non-idle operating state is also applicable for turbine engines that are implemented on applications other than on an aircraft, such as a land-based implementation or a marine-based implementation. In either a land-based implementation or a marine-based implementation, the turbine engine may be operated to be used for generating power, such as driving an electrical generator or driving a mechanical drive system. In the land-based implementation or in the marine-based implementation, the non-idle operating state may be a state in which the power level of the turbine engine is sufficient to provide necessary power for generating electricity, or for driving the mechanical drive system.

As used herein, the term "non-power-augmentation operating state" refers to an operating state of the gas turbine engine in which normal combustion within a first combustor of the gas turbine engine occurs, but in which a second combustor is idle such that neither fuel nor steam are provided to the second combustor. The non-power-augmentation operating state may occur during either the idle operating state as defined above, or during the non-idle operating state define above when power augmentation is not being performed.

As used herein, the term "power-augmentation operating state" refers to an operating state of the gas turbine engine during the non-idle operating state as defined above, but in which power or thrust augmentation is being performed. In the power-augmentation operating state, in the case when the steam generating system is generating steam normally, the steam generated by a steam generating system is provided to both a steam turbine and to the second combustor to provide power or thrust augmentation. Alternatively, in a case when power augmentation is being performed, but the steam generating system is not generating sufficient steam, the power-augmentation operating state is implemented by performing combustion within the second combustor and providing combustion products from the second combustor to the first combustor to obtain the power or thrust augmentation.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

In an aircraft gas turbine engine, a combustor may generally include a swirler that provides a flow of swirled air mixed with fuel into a combustion chamber, where the fuel and air mixture is ignited and burned to generate combustion gases that do work on turbines within a turbine section to rotate turbine rotors. The turbine rotors are generally connected to, and drive, compressor rotors that compress inlet air that is provided to the combustor. In some operating conditions of the gas turbine engine (e.g., during takeoff or climb-out of an aircraft), additional power may be needed. When the gas turbine engine increases power, additional carbon monoxide (CO) and nitrous oxide (NOx) emissions are generated by the combustor. One technique to attempt to reduce the CO and the NOx emissions in a high-power operating state is to include a steam turbine in the gas turbine engine, and to inject steam into the steam turbine to add additional power to the gas turbine engine, thereby reducing the CO and NOx emissions. The steam may also be injected into the combustor to increase the density of the combustion gases, thereby providing for additional work to be extracted by the turbine section from the denser exhaust gases. The use of the steam turbine, however, is generally only practical when the steam generating system is functioning properly to generate sufficient steam to be provided to the steam turbine or to the combustor.

The present disclosure provides a technique to continue to provide additional power to the gas turbine engine during a non-idle operating state, even if the steam generating system has a reduced steam generating capacity or is not able to generate steam at all. According to the present disclosure, a second combustor is provided in parallel with a first (or a main) combustor, and a second combustion chamber within the second combustor is connected to a first combustion chamber within the first combustor. When the steam generating system is functioning properly, steam can be provided to the second combustor, and the steam can then flow from the second combustion chamber into the first combustion chamber of the first combustor, thereby augmenting the thrust of the gas turbine engine at the non-idle operating state. On the other hand, when the steam generating system is not generating steam, fuel and compressor bleed air can be provided to the second combustor to generate combustion products within the second combustion chamber, and the combustion products from the second combustion chamber can flow into the first combustion chamber to mix with combustion gases generated by the first combustor so as to augment the thrust of the gas turbine engine. Additionally, in a case when the steam generating system is generating steam, but at a diminished level that is insufficient to provide all of the needed additional power via the steam turbine, the lower amount of steam can be provided to the second combustor, and the second combustor can also utilize the compressor bleed air and fuel to ignite a steam-air-fuel mixture within the second combustion chamber. The combustion products of the second combustor can then be provided to the first combustion chamber to, again, augment the thrust of the gas turbine engine.

Referring now to the drawings, FIG. 1 is a schematic cross-sectional diagram of an aircraft gas turbine engine 10 that may be installed on an aircraft (not shown) and that includes a steam generating system 100 (described below), taken along a longitudinal centerline axis 12 (provided for reference) of the aircraft gas turbine engine 10, according to an embodiment of the present disclosure. The present disclosure may be implemented in any of various types of aircraft turbine engines, including high bypass turbofan engines, open rotor turbo engines, turbojet engines, and turboprop engines. The gas turbine engine 10 may be controlled by a controller 13 that may monitor various systems within the gas turbine engine 10, and provides commands for controlling operations of the gas turbine engine 10. As shown in FIG. 1, the aircraft gas turbine engine 10 has a longitudinal direction L (extending parallel to the longitudinal centerline axis 12) and a radial direction R that is normal to the longitudinal direction L. In general, the aircraft gas turbine engine 10 includes a fan section 14 and a turbo-engine 16 disposed downstream from the fan section 14.

The turbo-engine 16 includes an outer casing 18 that encases the turbo-engine 16 and that is substantially tubular and defines an annular inlet 20. As schematically shown in FIG. 1, the turbo-engine 16 includes, in serial flow relationship, a compressor section 21 including a booster or a low-pressure compressor (LPC) 22, followed downstream by a high-pressure compressor (HPC) 24, a combustion section 26, a turbine section 27 including a high-pressure turbine (HPT) 28 followed downstream by a low-pressure turbine (LPT) 30, and an exhaust section 31 that includes one or more exhaust nozzles 32. A high-pressure (HP) shaft 34 drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustion section 26, the turbine section 27, and the exhaust section 31 including the one or more exhaust nozzles 32 together define a turbo-engine air flow path 33 therethrough.

For the embodiment depicted in FIG. 1, the fan section 14 includes a fan 38 (e.g., a variable pitch fan) having a plurality of fan blades 40 coupled to a disk 42 in a circumferentially spaced-apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1, but includes a plurality of gears (not shown) for adjusting the rotational speed of the fan shaft 45 and, adjusting the rotational speed of the fan 38 relative to the LP shaft 36.

Referring still to FIG. 1, the disk 42 is covered by a rotatable fan hub 48 that is aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced struts or outlet guide vanes 52. Moreover, a downstream section 54 of the nacelle 50 extends over an outer portion of the turbo-engine 16 to define a bypass airflow passage 56 therebetween. The one or more exhaust nozzles 32 may extend through the nacelle 50 and be formed therein. In the embodiment of FIG. 1, the one or more exhaust nozzles 32 include one or more discrete nozzles that are spaced circumferentially about the nacelle 50. Other arrangements of the one or more exhaust nozzles 32 may be used including, for example, a single exhaust nozzle that is annular, or partially annular, about the nacelle 50.

During a standard operating mode of the aircraft gas turbine engine 10, a volume of air 58 enters the aircraft gas turbine engine 10 through an inlet 60 of the nacelle 50 and/or the fan section 14. As the volume of air 58 passes across the fan blades 40, a first portion of the air 58, shown as bypass air 62, is directed or routed into the bypass airflow passage 56, and a second portion of the air 58, shown as turbo-engine inlet air 64, is directed or is routed into the upstream section of the turbo-engine air flow path 33, or, more specifically, into the annular inlet 20 of the LPC 22. A ratio between the bypass air 62 and the turbo-engine inlet air 64 is known as a bypass ratio. The pressure of the turbo-engine inlet air 64 is then increased by the LPC 22, generating compressed air 65, and the compressed air 65 is routed through the HPC 24, where it is further compressed before being directed into the combustion section 26, where the compressed air 65 is mixed with fuel 67 and burned to generate combustion gases 66 (also referred to as combustion products). One or more stages may be used in each of the LPC 22 and the HPC 24, with each subsequent stage further compressing the compressed air 65.

The combustion gases 66 are routed from the combustion section 26 into the HPT 28 and expanded through the HPT 28, where a portion of thermal energy and/or kinetic energy from the combustion gases 66 is extracted via sequential stages of HPT stator vanes 68 that are coupled to the outer casing 18, and HPT rotor blades 70 that are coupled to rotors connected to the HP shaft 34, thus, causing the HP shaft 34 to rotate, thereby supporting operation of the HPC 24. The combustion gases 66 are then routed into the LPT 30 and are further expanded through the LPT 30. Here, a second portion of thermal energy and/or the kinetic energy is extracted from the combustion gases 66 via sequential stages of LPT stator vanes 72 that are coupled to the outer casing 18, and LPT rotor blades 74 that are coupled to LPT rotors connected to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30.

The combustion gases 66 are subsequently routed through the one or more exhaust nozzles 32 of the turbo-engine 16 to provide propulsive thrust. Simultaneously with the flow of the turbo-engine inlet air 64 through the turbo-engine air flow path 33, the bypass air 62 is routed through the bypass airflow passage 56 before being exhausted from a fan bypass nozzle 76 of the aircraft gas turbine engine 10, also providing propulsive thrust. The HPT 28, the LPT 30, and the one or more exhaust nozzles 32 at least partially define a hot gas path 78 for routing the combustion gases 66 through the turbo-engine 16.

As noted above, the compressed air 65 is mixed with the fuel 67 in the combustion section 26 to form a fuel and air mixture, and the fuel and air mixture is then combusted, generating the combustion gases 66 (combustion products). The fuel 67 can include any type of hydrocarbon fuel used for turbine engines, such as, for example, sustainable aviation fuels (SAF) including biofuels, Jet A, Jet A-1, or other hydrocarbon fuels. Other fuel types, which may or may not be hydrocarbon fuels, but that may generally be used in an aircraft gas turbine engine may also be utilized to implement the present disclosure.

The compressor section 21 also includes a compressor bleed air system 94, which may generally be arranged at a downstream end of the HPC 24 and is arranged to bleed-off some of the compressed air 65 from the HPC 24 as a flow of compressor bleed air 69. The flow of compressor bleed air 69 is provided to a compressor bleed air valve 95 via a compressor bleed air duct 96. The compressor bleed air valve 95 can be controlled to divert at least a portion of the flow of compressor bleed air 69, via a compressor bleed air duct 97, to the combustion section 26. The compressor bleed air valve 95 can also be controlled to provide at least a portion of the flow of the compressor bleed air 69 to other systems within the gas turbine engine 10 via a compressor bleed air duct 99.

The aircraft gas turbine engine 10 includes a fuel system 80 for providing the fuel 67 to the combustion section 26. The fuel system 80 includes a fuel tank 82 for storing the fuel 67 therein, and a fuel delivery system 84. The fuel tank 82 can be located on an aircraft (not shown) to which the aircraft gas turbine engine 10 is attached. While a single fuel tank 82 is shown in FIG. 1, the fuel system 80 can include any number of fuel tanks 82, as desired. The fuel delivery system 84 delivers the fuel 67 from the fuel tank 82 to the combustion section/26 via one or more fuel supply lines 85. The fuel delivery system 84 also includes a fuel pump 86 to induce the flow of the fuel 67 through the fuel supply lines 85 to the combustion section 26. In this way, the fuel pump 86 pumps the fuel 67 from the fuel tank 82, through the fuel supply lines 85, and into the combustion section 26.

The aircraft gas turbine engine 10 of the present disclosure includes the steam generating system 100, which is in fluid communication with the one or more exhaust nozzles 32 and the fan bypass nozzle 76. As will be described in more detail below, the steam generating system 100 generates steam from the combustion gases 66 as the combustion gases 66 flow through the steam generating system 100, and may deliver at least a portion of the generated steam to the combustion section 26.

The aircraft gas turbine engine 10 depicted in FIG. 1 is by way of example only. In other exemplary embodiments, the aircraft gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable aircraft gas turbine engine, such as, for example, turbofan engines, open rotor turbo-engines, propfan engines, and/or turboprop engines.

Figure 2:
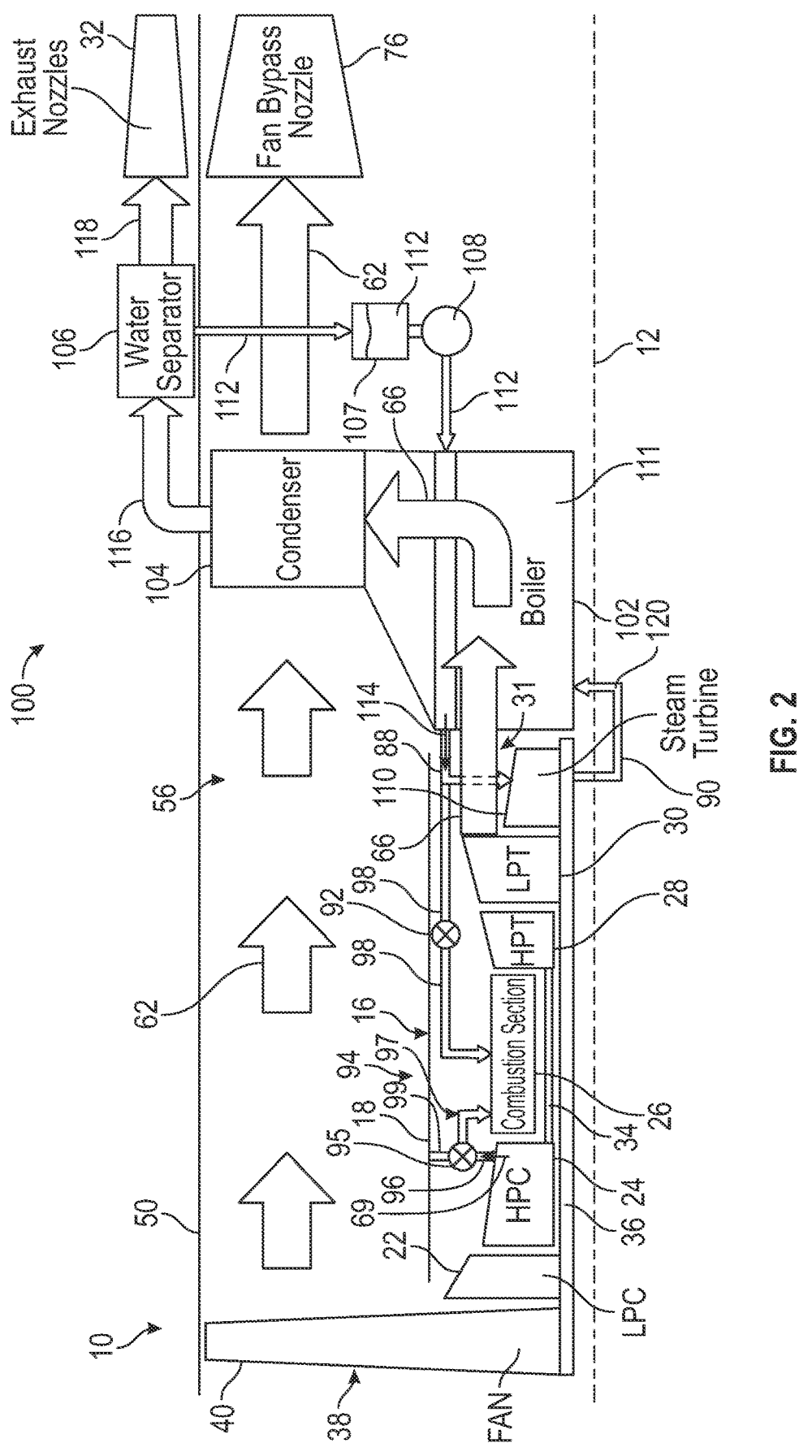

FIG. 2 is a schematic diagram of the aircraft gas turbine engine 10 and the steam generating system 100 of FIG. 1, according to an aspect of the present disclosure. For clarity, the aircraft gas turbine engine 10 is shown schematically in FIG. 2 and some components depicted and described above with regard to FIG. 1 are not shown in FIG. 2. As shown in FIG. 2, the steam generating system 100 includes a boiler 102, a condenser 104, a water/exhaust separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water from the exhaust (e.g., the combustion gases 66).

The water/exhaust separator 106 is in fluid communication with the condenser 104 for receiving cooled exhaust (combustion gases 66) having condensed water entrained therein. The water/exhaust separator 106 is also in fluid communication with the one or more exhaust nozzles 32 and with the water pump 108. The water/exhaust separator 106 includes any type of water separator for separating water from the exhaust. For example, the water/exhaust separator 106 can include a cyclonic separator that uses vortex separation to separate the water from the exhaust. In such embodiments, the water/exhaust separator 106 generates a cyclonic flow within the water/exhaust separator 106 to separate the water from the cooled exhaust. In FIG. 2, the water/exhaust separator 106 is schematically depicted as being in the nacelle 50, but the water/exhaust separator 106 could be located at other locations within the aircraft gas turbine engine 10, such as, for example, radially inward of the nacelle 50, closer to the turbo-engine 16.

The water/exhaust separator 106 may be driven to rotate by one of the engine shafts, such as the HP shaft 34 or the LP shaft 36, via an accessory gearbox (not shown). As noted above, the boiler 102 receives liquid water from a water source to generate steam or water vapor. The water source may be a water storage tank 107 that is provided between the water/exhaust separator 106 and the water pump 108. In the embodiment depicted in FIG. 2, the water storage tank 107 may, therefore, be the water source for the boiler 102.

The water pump 108 is in fluid communication with the water storage tank 107 and with the boiler 102. The water pump 108 may be any suitable pump, such as a centrifugal pump or a positive displacement pump. The water pump 108 directs separated water 112 that is stored in the water storage tank 107 through the boiler 102, where it is converted back to steam 114. The steam 114 is sent through the steam turbine 110 via a steam supply line 88 to provide work to drive the steam turbine 110.

In operation, the combustion gases 66, also referred to as exhaust, flow from the LPT 30 into the boiler 102 and into the condenser 104. The combustion gases 66 transfer heat into water 111 within the boiler 102 to generate the steam 114 within the boiler 102, as detailed further below. The combustion gases 66 then flow into the condenser 104, where the condenser 104 condenses the water contained within the combustion gases 66. The bypass air 62 flows through the bypass airflow passage 56 and over or through the condenser 104, and extracts heat from the combustion gases 66, cooling the combustion gases 66 and condensing the water from the combustion gases 66, to generate an exhaust-water mixture 116. The bypass air 62 is then exhausted out of the aircraft gas turbine engine 10 through the fan bypass nozzle 76 to generate thrust, as detailed above. The condenser 104 thus may be positioned in the bypass airflow passage 56.

The exhaust-water mixture 116 flows into the water/exhaust separator 106. The water/exhaust separator 106 separates the water and the exhaust gases from the exhaust-water mixture 116 to generate separate exhaust gases 118 and the water 112. The exhaust gases 118 are exhausted out of the aircraft gas turbine engine 10 through the one or more exhaust nozzles 32 to generate thrust, as detailed above. The boiler 102, the condenser 104, and the water/exhaust separator 106 thus also define a portion of the hot gas path 78 (FIG. 1) for routing the combustion gases 66, the exhaust-water mixture 116, and the exhaust gases 118 through the steam generating system 100 of the aircraft gas turbine engine 10.

The water pump 108 helps to urge the water 112 from the water/exhaust separator 106 into the water storage tank 107, and pumps the water 112 through one or more water lines (as indicated by the arrow for the water 112 in FIG. 2) so that the water 112 flows into the boiler 102 to mix with the water 111. The water 111 flows through the boiler 102 and the combustion gases 66 flowing through the boiler 102 transfer heat into the water 111 to vaporize the water 111 and to generate the steam 114.

The steam turbine 110 is coupled to the LP shaft 36, but may also be coupled to the HP shaft 34. The steam turbine 110 includes one or more stages of steam turbine blades (not shown) and steam turbine stators (not shown). The steam 114 flows from the boiler 102 via a steam supply line 88 into the steam turbine 110, causing the steam turbine blades of the steam turbine 110 to rotate, thereby generating additional work in the LP shaft 36. Additionally, at least a portion of the steam 114 may flow through one or more combustor steam supply lines 98 into the combustion section 26, and a steam control valve 92 may be provided within the combustor steam supply line 98 to control a flow of the steam 114 into the combustion section 26. As for the steam 114 provided to the steam turbine 110, the remaining steam (as steam 120) may then flow from the steam turbine 110, through one or more steam supply lines 90, back into the boiler 102.

As was described above, the compressor section 21 (FIG. 1) includes the compressor bleed air system 94, which may generally be arranged at a downstream end of the HPC 24 and is arranged to bleed-off some of the compressed air 65 from the HPC 24 as a flow of compressor bleed air 69. The flow of compressor bleed air 69 is provided to the compressor bleed air valve 95 via the compressor bleed air duct 96. The compressor bleed air valve 95 can be controlled to divert at least a portion of the flow of compressor bleed air 69, via the compressor bleed air duct 97, to the combustion section 26. The compressor bleed air valve 95 can also be controlled to provide at least a portion of the flow of the compressor bleed air 69 to other systems within the gas turbine engine 10 via the compressor bleed air duct 99.

Figure 3:
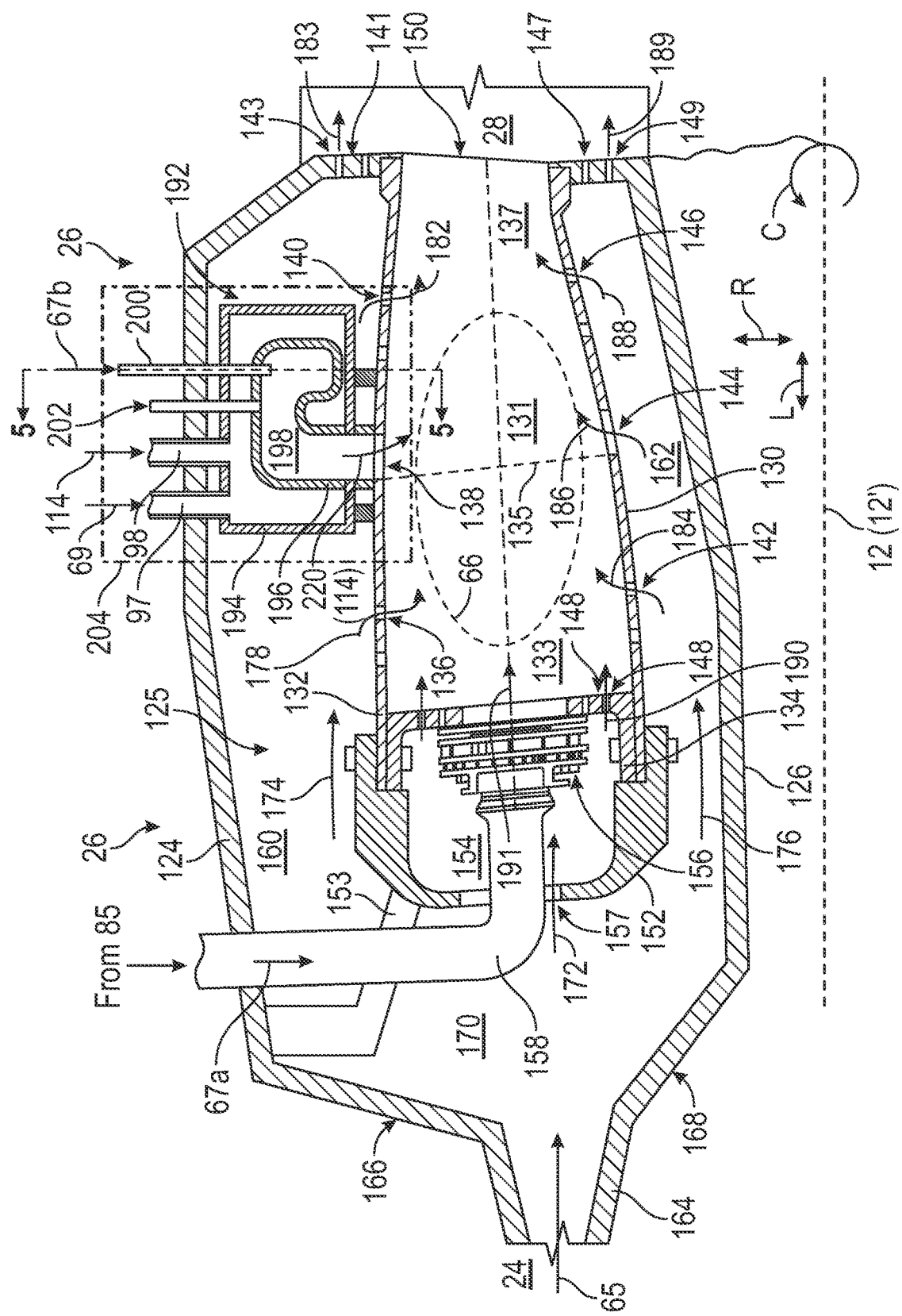
FIG. 3 is a partial cross-sectional side view of an exemplary combustion section of the gas turbine engine of FIG. 1, according to an aspect of the present disclosure.

FIG. 3 is a partial cross-sectional side view of an exemplary combustion section 26 of the turbo-engine 16 as shown in FIG. 1, according to an aspect of the present disclosure. The exemplary combustion section 26 shown in FIG. 3 is depicted as an annular type combustion section that extends circumferentially about the longitudinal centerline axis 12. With respect to the combustion section 26, the longitudinal centerline axis 12 may also correspond to a combustor centerline axis 12'. The combustion section 26 includes a combustor outer casing 124 and a combustor inner casing 126 that each extends annularly about the combustor centerline axis 12'. A first combustor 125 is arranged within the combustor outer casing 124 and the combustor inner casing 126. The first combustor 125 includes a first combustor inner liner 130, a first combustor outer liner 132, and a dome structure 134, each of which extends circumferentially about the combustor centerline axis 12'. A first combustion chamber 131 is defined between the first combustor inner liner 130, the first combustor outer liner 132, and the dome structure 134. As will be described in more detail below, the first combustion chamber 131 may be theoretically divided into a primary combustion zone 133 and a secondary combustion zone 137 downstream of the primary combustion zone 133, where, in FIG. 3, a dashed line 135 represents the theoretical division between the primary combustion zone 133 and the secondary combustion zone 137.

The first combustor outer liner 132 may include various airflow openings therethrough, including a plurality of primary zone cooling openings 136, a plurality of dilution openings 138 (one shown in FIG. 3), and a plurality of secondary zone cooling openings 140. Similarly, the first combustor inner liner 130 may include various airflow openings therethrough, including a plurality of primary zone cooling openings 142, a plurality of dilution openings 144 (one shown in FIG. 3), and a plurality of secondary zone cooling openings 146. In addition, the dome structure 134 may include a plurality of cooling airflow openings 148 therethrough. Further, a downstream end 143 of the combustor outer casing 124 may include a plurality of airflow openings 141 to provide a flow of turbine cooling air 183 into the HPT 28, and a downstream end 149 of the combustor inner casing 126 may include a plurality of airflow openings 147 to provide a flow of turbine cooling air 189 to the HPT 28.

The first combustor 125 further includes a plurality of swirler assemblies 156 (one shown in FIG. 3) that are connected to the dome structure 134, and a plurality of first fuel nozzles 158 (one shown in FIG. 3) that are connected to respective ones of the plurality of swirler assemblies 156. As will be described below, each of the plurality of first fuel nozzles 158 injects the fuel 67 into a respective one of the swirler assemblies 156.

The first combustor inner liner 130 and the first combustor outer liner 132 are connected to the dome structure 134, thereby defining the first combustion chamber 131 therebetween. The first combustor inner liner 130 and the first combustor outer liner 132 extend from the dome structure 134 to a combustor outlet 150 at an entry to the HPT 28 (FIG. 1), thus, at least partially defining a hot gas path between the dome structure 134 and the HPT 28. In addition, a cowl 152 is connected to the first combustor inner liner 130, to the first combustor outer liner 132, and to the dome structure 134, thereby defining a plenum 154 therewithin. The cowl 152 extends circumferentially about the combustor centerline axis 12' and may be formed of a single cowl structure, or may be formed by multiple cowl structures that are connected together. The cowl 152 includes a plurality of cowl airflow openings 157 (one shown in FIG. 3), where each opening corresponds to a respective one of the plurality of swirler assemblies 156. Each cowl airflow opening 157 provides a flow of air therethrough into the plenum 154. The cowl 152 is connected to the combustor outer casing 124 via a cowl mounting arm 153.

As shown in FIG. 3, the combustor outer casing 124 and the combustor inner casing 126 surround the first combustor outer liner 132 and the first combustor inner liner 130. An outer airflow passage 160 is defined between the combustor outer casing 124 and the first combustor outer liner 132, and an inner airflow passage 162 is defined between the combustor inner casing 126 and the first combustor inner liner 130. A diffuser 164 is connected to the combustion section 26 between an upstream end 166 of the combustor outer casing 124 and an upstream end 168 of the combustor inner casing 126. A pressure plenum 170 is defined between the upstream end 166 of the combustor outer casing 124 and the upstream end 168 of the combustor inner casing 126. The diffuser 164 provides a flow of the compressed air 65 from the HPC 24 into the pressure plenum 170.

Referring still to FIG. 3, during operation of the aircraft gas turbine engine 10, the compressed air 65 flows through the diffuser 164 and into the pressure plenum 170 of the combustion section 26 to pressurize the pressure plenum 170. A first portion of the compressed air 65 in the pressure plenum 170, as indicated schematically by an arrow denoting compressed air 172, flows from the pressure plenum 170 into the plenum 154 of the cowl 152. The compressed air 172 then flows through the swirler assemblies 156, where it is mixed with the fuel 67 provided by the first fuel nozzles 158. A fuel-air mixture 191 is generated within each of the swirler assemblies 156 and the fuel-air mixture 191 is then injected into the first combustion chamber 131 by the swirler assemblies 156, where the air/fuel mixture is ignited by an ignitor (not shown) and burned to generate the combustion gases 66 within the first combustion chamber 131. A portion of the compressed air 172 within the plenum 154, shown schematically by arrows denoting cooling air 190, may flow through the cooling airflow openings 148 in the dome structure 134 to provide cooling of a downstream side of the dome structure 134. While not shown in FIG. 3, the dome structure 134 may include a deflector or a heat shield on the downstream side to protect the dome structure 134 from heat generated in the first combustion chamber 131, and the cooling airflow openings 148 would extend through the deflector or the heat shield.

A second portion of the compressed air 65 in the pressure plenum 170, as indicated schematically by arrows denoting compressed air 174 and compressed air 176, may be routed into the outer airflow passage 160, and into the inner airflow passage 162, respectively. A portion of the compressed air 174 flowing through the outer airflow passage 160, shown schematically as cooling air 178, may be routed through the plurality of primary zone cooling openings 136 into the primary combustion zone 133 of the first combustion chamber 131. Another portion of the compressed air 174 flowing through the outer airflow passage 160, shown schematically as cooling air 182, may be routed through the secondary zone cooling openings 140 into the secondary combustion zone 137 of the first combustion chamber 131. Similarly, a portion of the compressed air 176 flowing through the inner airflow passage 162, shown schematically as cooling air 184, may be routed through the plurality of primary zone cooling openings 142 into the primary combustion zone 133 of the first combustion chamber 131. Another portion of the compressed air 176 flowing through the inner airflow passage 162, shown schematically as dilution airflow 186, may be routed through the dilution openings 144 of the first combustor inner liner 130 into the first combustion chamber 131 to provide quenching of the combustion gases 66. Yet another portion of the compressed air 176 flowing through the inner airflow passage 162, shown schematically as cooling air 188, may be routed through the secondary zone cooling openings 146 into the secondary combustion zone 137 of the first combustion chamber 131.

In FIG. 3, the combustion section 26 further includes a second combustor 192 that is arranged within the outer airflow passage 160. While FIG. 3 depicts the second combustor 192 as being arranged within the outer airflow passage 160, the second combustor 192 may be arranged within the inner airflow passage 162 instead. The second combustor 192 includes a second combustor casing 194 and a second combustor liner 196 arranged within the second combustor casing 194. The second combustor liner 196 defines therewithin a second combustion chamber 198. The compressor bleed air duct 97 is connected to the second combustor 192 to provide the flow of compressor bleed air 69 to the second combustor 192. In addition, the combustor steam supply line 98 is connected to the second combustor 192 to provide the flow of the steam 114 to the second combustor 192. Further, the second combustor 192 includes a second fuel nozzle 200 that is arranged to provide a second flow of fuel 67b to the second combustion chamber 198, and an ignitor 202 is arranged to provide a spark to the second combustion chamber 198 for igniting a fuel-air mixture (described below) within the second combustion chamber 198.

Figure 4:
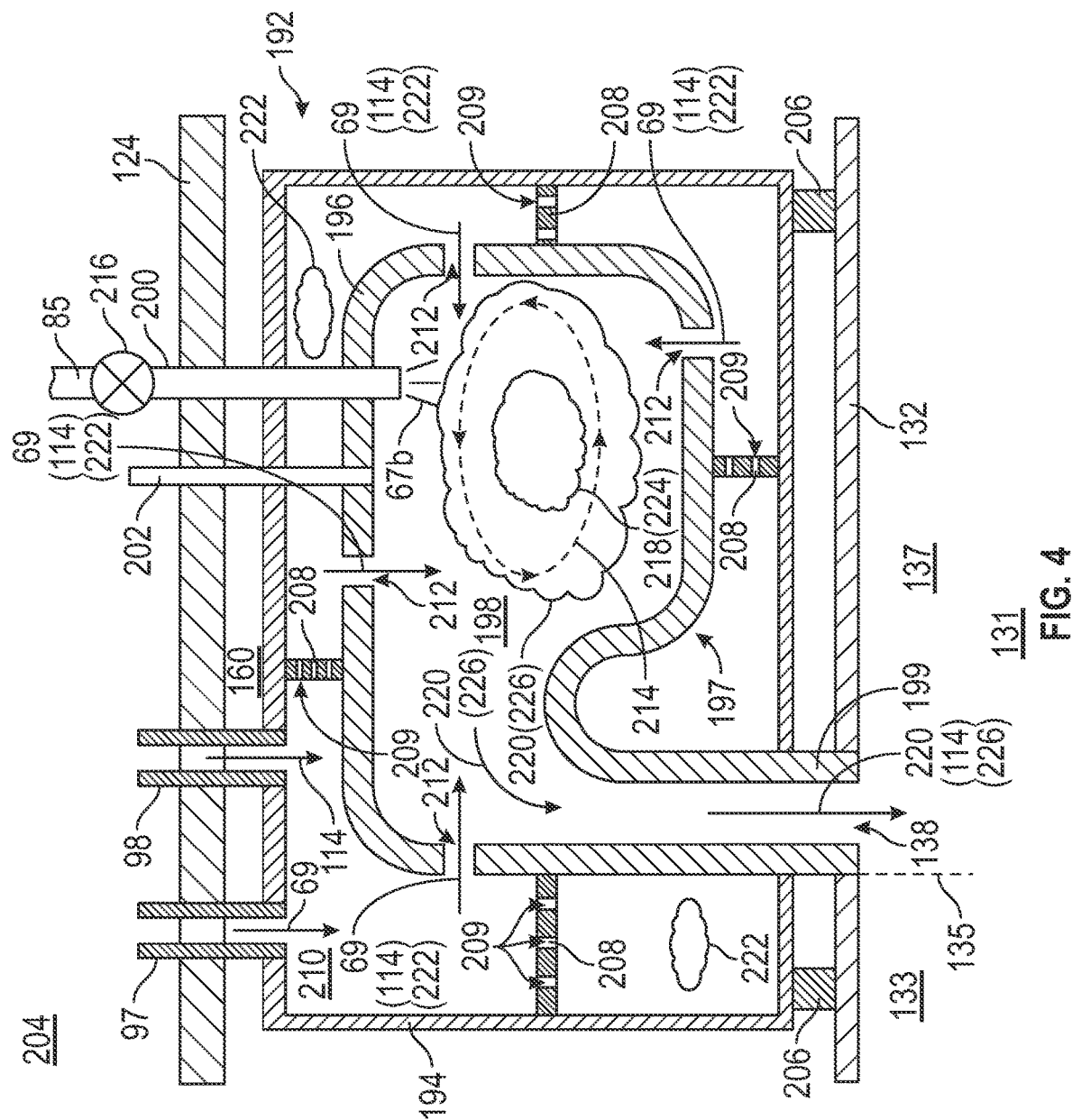
FIG. 4 is an enlarged detail view of a second combustor, taken at detail view 204 of FIG. 3, according to an aspect of the present disclosure.

FIG. 4 is an enlarged detail view of the second combustor 192, taken at detail view 204 of FIG. 3, according to an aspect of the present disclosure. As was briefly described above, the second combustor 192 is arranged within the outer airflow passage 160 between the combustor outer casing 124 and the first combustor outer liner 132. The second combustor 192 includes the second combustor casing 194, which may be mounted to the first combustor outer liner 132 via one or more mounting brackets 206. The second combustor casing 194 may, however, be mounted to the combustor outer casing 124. Included within the second combustor casing 194 is the second combustor liner 196, which defines therewithin, the second combustion chamber 198. In the FIG. 4 aspect, a single second combustor liner 196 is provided within the second combustor casing 194. However, as will be described below, more than one second combustor liner 196 may be provided within the second combustor casing 194. The second combustor liner 196 of FIG. 4 is shown to be configured as a trapped vortex combustor liner 197, but other types of combustor liners may also be implemented instead of a trapped vortex combustor liner. The second combustor liner 196 includes an outlet 199 that extends through the second combustor casing 194 and also extends through the first combustor outer liner 132 via the dilution opening 138. The outlet 199 provides fluid communication from the second combustion chamber 198 to the secondary combustion zone 137 of the first combustion chamber 131. The second combustor liner 196 may be mounted within the second combustor casing 194 via one or more mounting brackets 208 that include one or more openings 209 therethrough. A second combustor plenum 210 is defined between the second combustor casing 194 and the second combustor liner 196 and surrounds the second combustor liner 196. The openings 209 through the mounting brackets 208 allow for a free flow of air or steam throughout the second combustor plenum 210 around the exterior side of the second combustor liner 196. Alternatively, rather than the second combustor liner 196 being connected to the first combustor outer liner 132 via the mounting brackets 208, the second combustor liner 196 may be formed integral with the first combustor outer liner 132. For example, the second combustor liner 196 may be welded to, or brazed to, the first combustor outer liner 132.

As shown in FIG. 4, the compressor bleed air duct 97 extends through the combustor outer casing 124 and is connected to the second combustor casing 194 so as to provide fluid communication from the compressor bleed air duct 97 into the second combustor plenum 210. In addition, the combustor steam supply line 98 extends through the combustor outer casing 124 and is connected to the second combustor casing 194 so as to provide fluid communication from the combustor steam supply line 98 into the second combustor plenum 210. As will be described below, in some operating states of the gas turbine engine 10, the compressor bleed air 69 is provided to the second combustor plenum 210 via the compressor bleed air duct 97, or the steam 114 is provided to the second combustor plenum 210 via the combustor steam supply line 98. The second fuel nozzle 200 extends through the combustor outer casing 124, and extends through the second combustor liner 196 to provide the second flow of fuel 67b to the second combustion chamber 198. The ignitor 202 also extends through the combustor outer casing 124 and through the second combustor liner 196, and, when combustion is to be effected within the second combustion chamber 198, the ignitor 202 provides a spark to ignite a fuel-air mixture 218 within the second combustion chamber 198.

The second combustor liner 196 includes a plurality of openings 212 that extend through the second combustor liner 196. Each of the openings 212 provides fluid communication from the second combustor plenum 210 and the second combustion chamber 198. As will be described below, when the compressor bleed air 69 is provided to the second combustor plenum 210 via the compressor bleed air duct 97, the compressor bleed air 69 flows through the openings 212 from the second combustor plenum 210 into the second combustion chamber 198. As described above, the second combustor liner 196 may be configured as the trapped vortex combustor liner 197. The openings 212 are, therefore, arranged through the trapped vortex combustor liner 197 so as to generate a trapped vortex flow 214 within the trapped vortex combustor liner 197. In FIG. 4, the arrangement of the openings 212 is such as to generate a counter-clockwise trapped vortex flow 214. In the case when the compressor bleed air 69 is provided to the second combustion chamber 198 via the openings 212, and combustion is to be effected within the second combustion chamber 198, a second combustor fuel valve 216 is opened to allow the second flow of fuel 67b (a first flow of the fuel 67a being provided to the swirler assembly 156 via the first fuel nozzle 158 as described above for FIG. 3) to flow into the second combustion chamber 198. The second flow of fuel 67b and the compressor bleed air 69 are mixed together in the trapped vortex flow 214 to generate the fuel-air mixture 218, and the fuel-air mixture 218 is ignited by the ignitor 202, thereby generating first combustion products 220 within the second combustion chamber 198. The first combustion products 220 then flow through the outlet 199 into the secondary combustion zone 137 of the first combustion chamber 131 of the first combustor 125. Thus, in the case when combustion is to be implemented within the second combustor 192 (e.g., during the non-idle operating state of the gas turbine engine 10), the first combustion products 220 can mix with the combustion gases 66 (FIG. 3) within the first combustion chamber 131 so as to augment the thrust of the gas turbine engine 10.

Continuing with the discussion of FIG. 4, in the case when the steam 114 is provided to the second combustor plenum 210 via the combustor steam supply line 98, the steam 114 flows through the openings 212 from the second combustor plenum 210 into the second combustion chamber 198. The steam 114 can then flow from the outlet 199 of the second combustion chamber 198 into the secondary combustion zone 137 of the first combustion chamber 131 in the first combustor 125. In this manner, the steam 114 flowing into the first combustion chamber 131 can mix with the combustion gases 66 (FIG. 3) to provide some quenching of the combustion gases 66, and, to increase the density of combustion gases 66 so as to provide additional kinetic energy for driving the turbine section 27 (FIG. 1) during the non-idle operating state of the gas turbine engine 10 (FIG. 1).

In yet another case when both the steam 114 is provided to the second combustor plenum 210 and the compressor bleed air 69 is provided to the second combustor plenum 210, the compressor bleed air 69 and the steam 114 mix together within the second combustor plenum 210 to form a steam-air mixture 222 within the second combustor plenum 210. The steam-air mixture 222 then flows through the openings 212 of the second combustor liner 196 into the second combustion chamber 198. The second fuel nozzle 200 is also enabled to provide the second flow of fuel 67b into the second combustion chamber 198, and the second flow of fuel 67b mixes with the steam-air mixture 222 within the second combustion chamber 198 to form a steam-air-fuel mixture 224. The steam-air-fuel mixture 224 is ignited by the ignitor 202 and burned to generate second combustion products 226. The second combustion products 226 then flow through the outlet 199 into the secondary combustion zone 137 of the first combustion chamber 131. Thus, the second combustion products 226, similar to the first combustion products 220, can mix with the combustion gases 66

(FIG. 3) within the first combustion chamber 131 to augment the thrust of the gas turbine engine 10.

Figure 5:
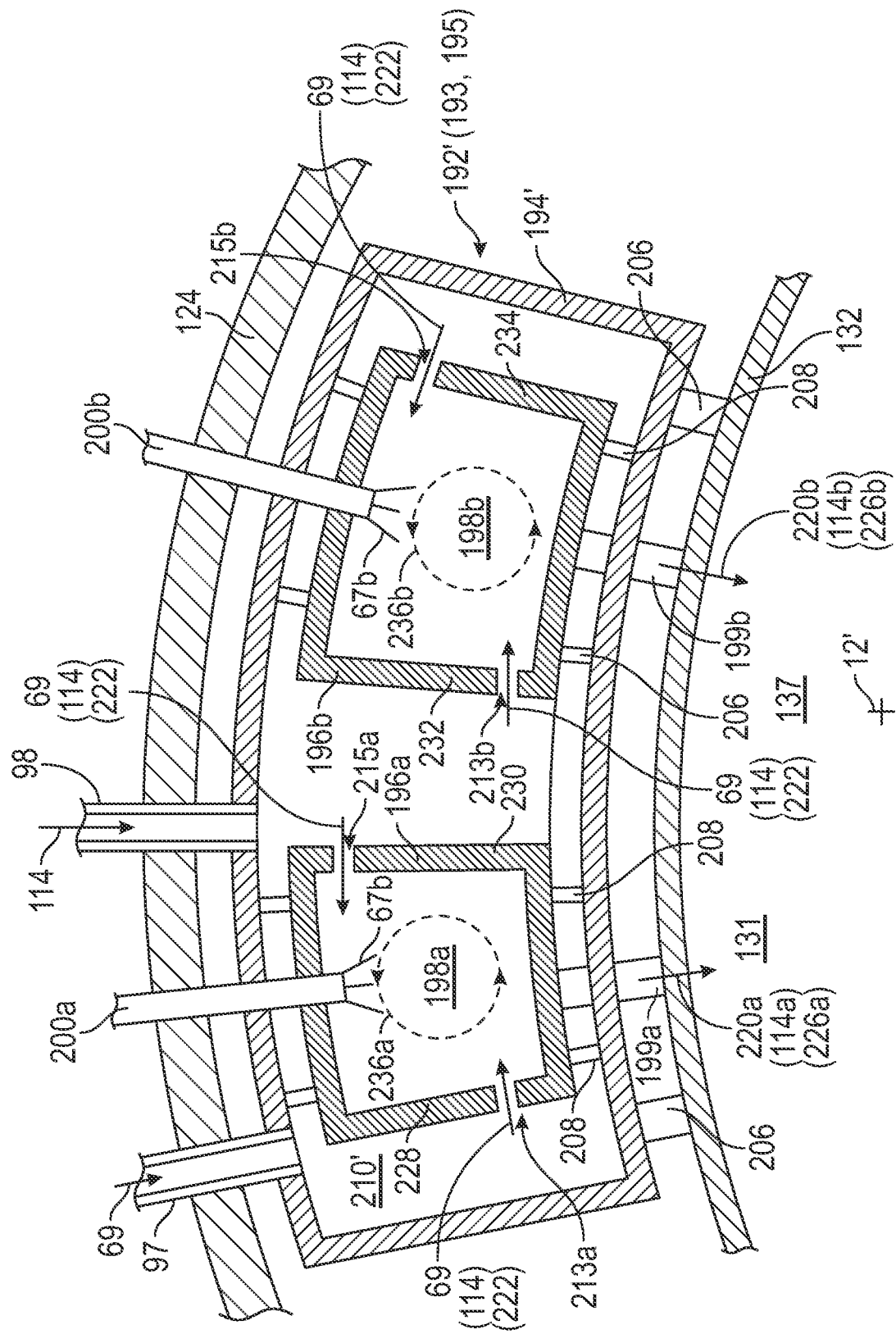
FIG. 5 is a partial cross-sectional view of a semi-annular second combustor having multiple second combustion chambers as an alternate to the annular second combustor of FIG. 3, taken at plane 5-5 of FIG. 3, according to an aspect of the present disclosure.

FIG. 5 is a partial cross-sectional view of a semi-annular second combustor 192' having multiple second combustion chambers as an alternate to the annular second combustor 192 of FIG. 3, taken at plane 5-5 of FIG. 3, according to an aspect of the present disclosure. As was stated above, the second combustor casing 194 (FIG. 4) may include more than one second combustor liner 196 (FIG. 4). FIG. 5 depicts a second combustor casing 194' that includes multiple second combustor liners, including a second combustor liner 196a and a second combustor liner 196b. Both the second combustor liner 196a and the second combustor liner 196b may be similar to the second combustor liner 196 of FIG. 4, and, both the second combustor liner 196a and the second combustor liner 196b may be trapped vortex combustor liners similar to the trapped vortex combustor liner 197 of FIG. 4. A second fuel nozzle 200a extends through the combustor outer casing 124, extends through the second combustor casing 194', and extends through the second combustor liner 196a so at provide a flow of the fuel, the second flow of fuel 67b to a second combustion chamber 198a of the second combustor liner 196a. Similar to the FIG. 4 aspect, the compressor bleed air duct 97 extends through the combustor outer casing 124 and through the second combustor casing 194' so as to provide a flow of the compressor bleed air 69 to a second combustor plenum 210'. In addition, the combustor steam supply line 98 extends through the combustor outer casing 124 and through the second combustor casing 194' to provide a flow of the steam 114 to the second combustor plenum 210'.

Each of the second combustor liner 196a and the second combustor liner 196b includes the openings 212 of FIG. 4, but, also includes additional openings. For example, a first sidewall 228 of the second combustor liner 196a includes at least one sidewall opening 213a therethrough, and a second sidewall 230 of the second combustor liner 196a includes at least one sidewall opening 215a therethrough. Similarly, for the second combustor liner 196b, a first sidewall 232 of the second combustor liner 196b includes at least one sidewall opening 213b therethrough, and a second sidewall 234 of the second combustor liner 196b includes at least one sidewall opening 215b therethrough. Similar to the openings 212 of FIG. 4, any one of the compressor bleed air 69, the steam 114, or the steam-air mixture 222 can flow through the sidewall opening 213a, through the sidewall opening 215a, through the sidewall opening 213b, and through the sidewall opening 215b into the second combustion chamber 198a and into the second combustion chamber 198b, respectively. The sidewall opening 213a and the sidewall opening 215a of the second combustor liner 196a are arranged to generate a swirled flow 236a within the second combustion chamber 198a, and the sidewall opening 213b and the sidewall opening 215b of the second combustor liner 196b are arranged to generate a swirled flow 236b within the second combustion chamber 198b. The swirled flow 236a and the swirled flow 236b can help to provide better mixing of the fuel 67 with either the compressor bleed air 69 or with the steam-air mixture 222.

As also shown in FIG. 5, the second combustor liner 196a has an outlet 199a (similar to the outlet 199 of FIG. 4), and the second combustor liner 196b has an outlet 199b (again, similar to the outlet 199 of FIG. 4). Each of the outlet 199a and the outlet 199b is in fluid communication with the secondary combustion zone 137 of the first combustion chamber 131 of the first combustor 125. Thus, as was discussed above for FIG. 4, for the FIG. 5 aspect, the outlet 199a of the second combustor liner 196a provides a flow of any one of first combustion products 220a, steam 114a, or second combustion products 226a into the secondary combustion zone 137. Similarly, the outlet 199b of the second combustor liner 196b provides a flow of any one of first combustion products 220b, steam 114b, or second combustion products 226b into the secondary combustion zone 137.

As further shown in FIG. 5, the second combustor 192' extends partially annularly about the combustor centerline axis 12'. Thus, the second combustor 192' may be considered to be a localized combustor 193 that does not extend annularly about the combustor longitudinal centerline axis 12'. In other words, the second combustor 192' is a partial-annular combustor 195 that extends partially annularly about the combustor centerline axis 12'. While a single second combustor 192' is shown in FIG. 5, the combustion section 26 may include more than one second combustor 192', where the second combustors 192' are spaced apart circumferentially about the combustor centerline axis 12'. In addition, multiple second combustors 192 (FIG. 4) may be included in the combustion section 26 (FIG. 1), where, again, each second combustor 192 is circumferentially spaced apart about the combustor centerline axis 12'.

Figure 6:
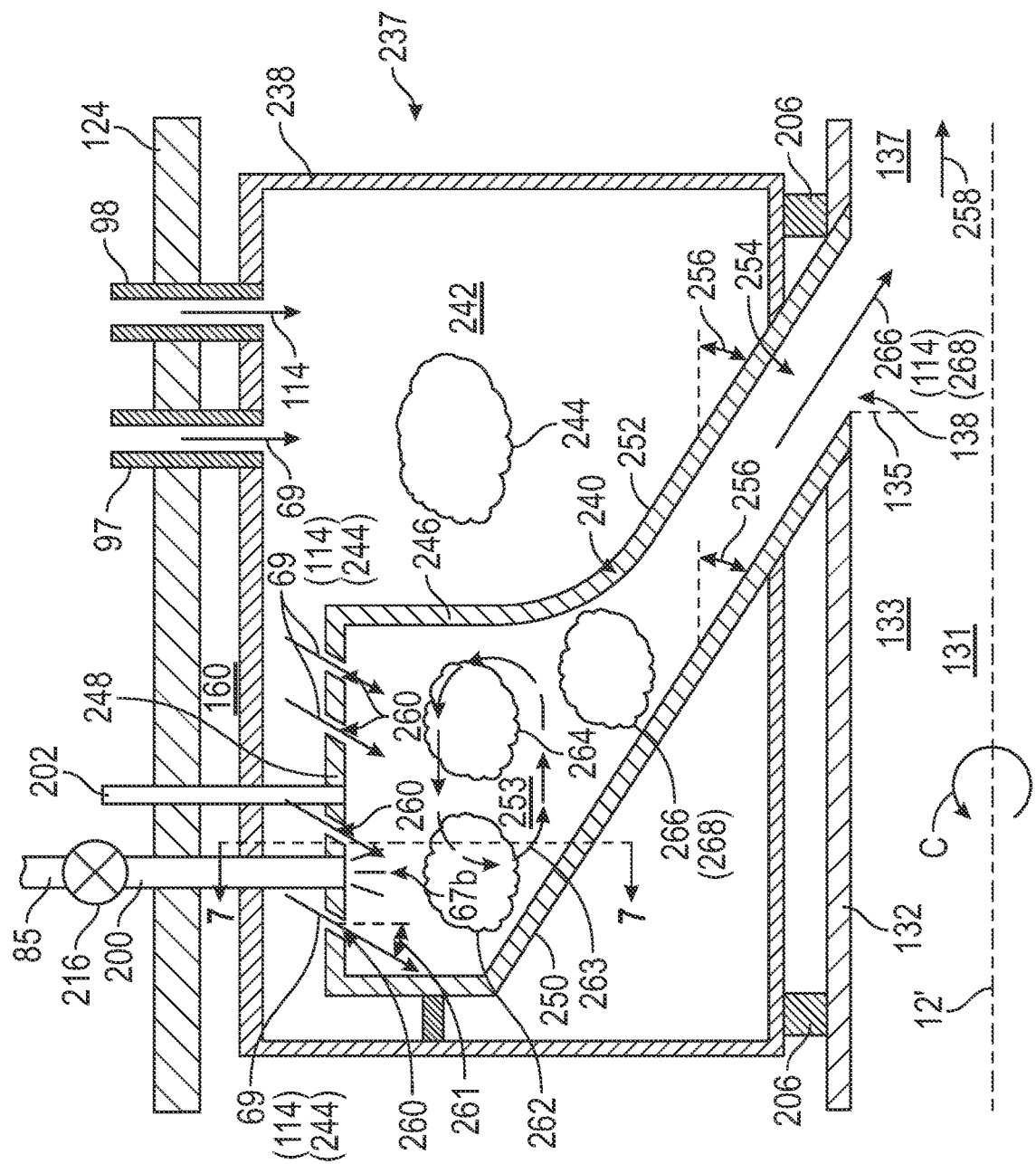
FIG. 6 is a partial cross-sectional side view of an alternate second combustor to that shown in FIG. 4, according to another aspect of the present disclosure.

FIG. 6 is a partial cross-sectional side view of an alternate second combustor 237 to that shown in FIG. 4, according to another aspect of the present disclosure. In FIG. 6, an alternate second combustor 237 includes a second combustor casing 238 and a second combustor liner 240, with a second combustor plenum 242 being defined between the second combustor casing 238 and the second combustor liner 240. The second combustor casing 238 is similar to the second combustor casing 194 of the FIG. 4 aspect. Similar to the FIG. 4 aspect, in the FIG. 6 aspect, the second combustor 237 includes the compressor bleed air duct 97 extending through the combustor outer casing 124 and extending through the second combustor casing 238 to provide the flow of the compressor bleed air 69 into the second combustor plenum 242. In addition, the second combustor 237 includes the combustor steam supply line 98 that extends through the combustor outer casing 124 and through the second combustor casing 238 to provide the flow of steam 114 to the second combustor plenum 242. In some aspects as described below, both the compressor bleed air 69 and the steam 114 may be simultaneously provided to the second combustor plenum 242, thereby resulting in a steam-air mixture 244 being generated within the second combustor plenum 242.

In contrast to the FIG. 4 aspect, the second combustor liner 240 of the FIG. 6 aspect is not a trapped vortex combustor liner, but, rather, is an axial-flow second combustor liner 246 that includes a dome 248, an upstream liner portion 250, and a downstream liner portion 252 that define therewithin a second combustion chamber 253. The upstream liner portion 250 and the downstream liner portion 252 also define an outlet 254 therebetween. The upstream liner portion 250 and the downstream liner portion 252 are arranged at an angle 256 with respect to the combustor centerline axis 12' so that the outlet 254 is arranged at the angle 256 to direct the flow exiting the outlet 254 in a generally downstream direction 258. The outlet 254 may also be arranged at a circumferential angle (not shown) with respect to the circumferential direction C about the centerline axis 12'. By arranging the outlet 254 at a circumferential angle, a tangential flow from the outlet 254 can be imparted into the secondary combustion zone 137 of the combustion chamber 131 so as to provide quicker and better mixing with the combustion gases 66.

The dome 248 includes a plurality of dome openings 260 extending through the dome 248. Each of the plurality of dome openings 260 may be arranged at an angle 261 so as to provide for a swirled flow 263 within the second combustion chamber 253. The plurality of dome openings 260 provide for any one of the compressor bleed air 69, the steam 114, or the steam-air mixture 244 to flow from the second combustor plenum 242 into the second combustion chamber 253. Similar to the FIG. 4 aspect, the second combustor 237 includes the at least one second fuel nozzle 200 and the ignitor 202 that both extend through the combustor outer casing 124, extend through the second combustor casing 238, and extend through the dome 248 of the second combustor liner 240. The at least one second fuel nozzle 200 can therefore provide the second flow of fuel 67b into the second combustor liner 240 to mix with the compressor bleed air 69 to form a fuel-air mixture 262, or to mix with the steam-air mixture 244 to form a steam-air-fuel mixture 264, within the second combustion chamber 253. The ignitor 202 can then provide a spark to ignite the fuel-air mixture 262 to generate first combustion products 266, or to ignite the steam-air-fuel mixture 264 to generate second combustion products 268. Depending on the operating state of the second combustor 237, as will be described below, any one of the steam 114, the first combustion products 266, or the second combustion products 268 flow from the outlet 254 into the secondary combustion zone 137 of the first combustion chamber 131 to mix with the combustion gases 66 (FIG. 3).

Figure 7:
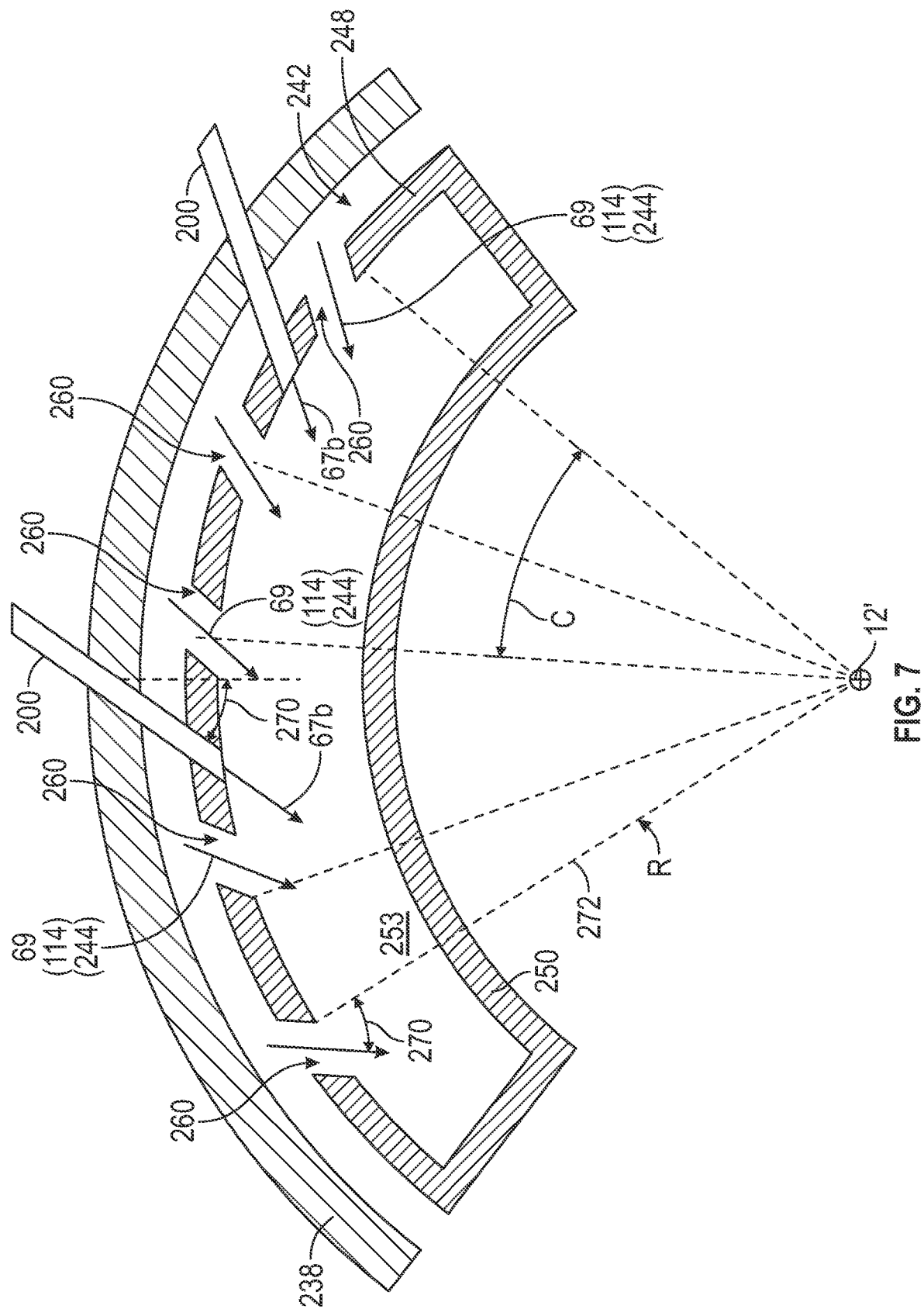
FIG. 7 is a partial cross-sectional view of an alternate second combustor liner, taken at plane 7-7 of FIG. 6, according to an aspect of the present disclosure.

FIG. 7 is a partial cross-sectional view of the alternate second combustor liner 240, taken at plane 7-7 of FIG. 6, according to an aspect of the present disclosure. In FIG. 7, the plurality of dome openings 260 are shown to be arranged at a tangential angle 270, with respect to a radial direction 272 extending from the combustor centerline axis 12'. In addition, the second fuel nozzles 200 are arranged at the tangential angle 270. As a result, the plurality of dome openings 260 can provide the flow of any of the compressor bleed air 69, the steam 114, or the steam-air mixture 244 into the second combustion chamber 253 in a tangential direction (i.e., tangential to the circumferential direction C about the combustor centerline axis 12') to allow for better mixing within the second combustion chamber 253.

The foregoing description of FIG. 1 to FIG. 7 describes various structures of the combustion section 26 of the gas turbine engine 10. The gas turbine engine 10 may be operated in any of a low power operating state (e.g., during descent or landing of an aircraft), a normal power operating state (e.g., during taxiing, or during cruise of the aircraft), or a high power operating state (e.g., during takeoff and climbout of the aircraft). The foregoing description also discussed providing any one of the compressor bleed air 69, the steam 114, or both the compressor bleed air 69 and the steam 114 to the second combustor 192 or to the second combustor 237. The following description will discuss various operating states of the combustion section 26, with a focus on the operation of the second combustor 192 or the second combustor 237, in conjunction with the operation of the steam generating system 100. More particularly, the following description generally describes a first case when the steam generating system 100 functions normally to provide steam to the second combustor 192 during a non-idle operating state, a second case when the steam generating system 100 has a total (or a near total) loss of steam generating capability during the non-idle operating state, and a third case in which the steam generating system 100 has a partial loss of steam generating capability during the non-idle operating state.

Figure 8:
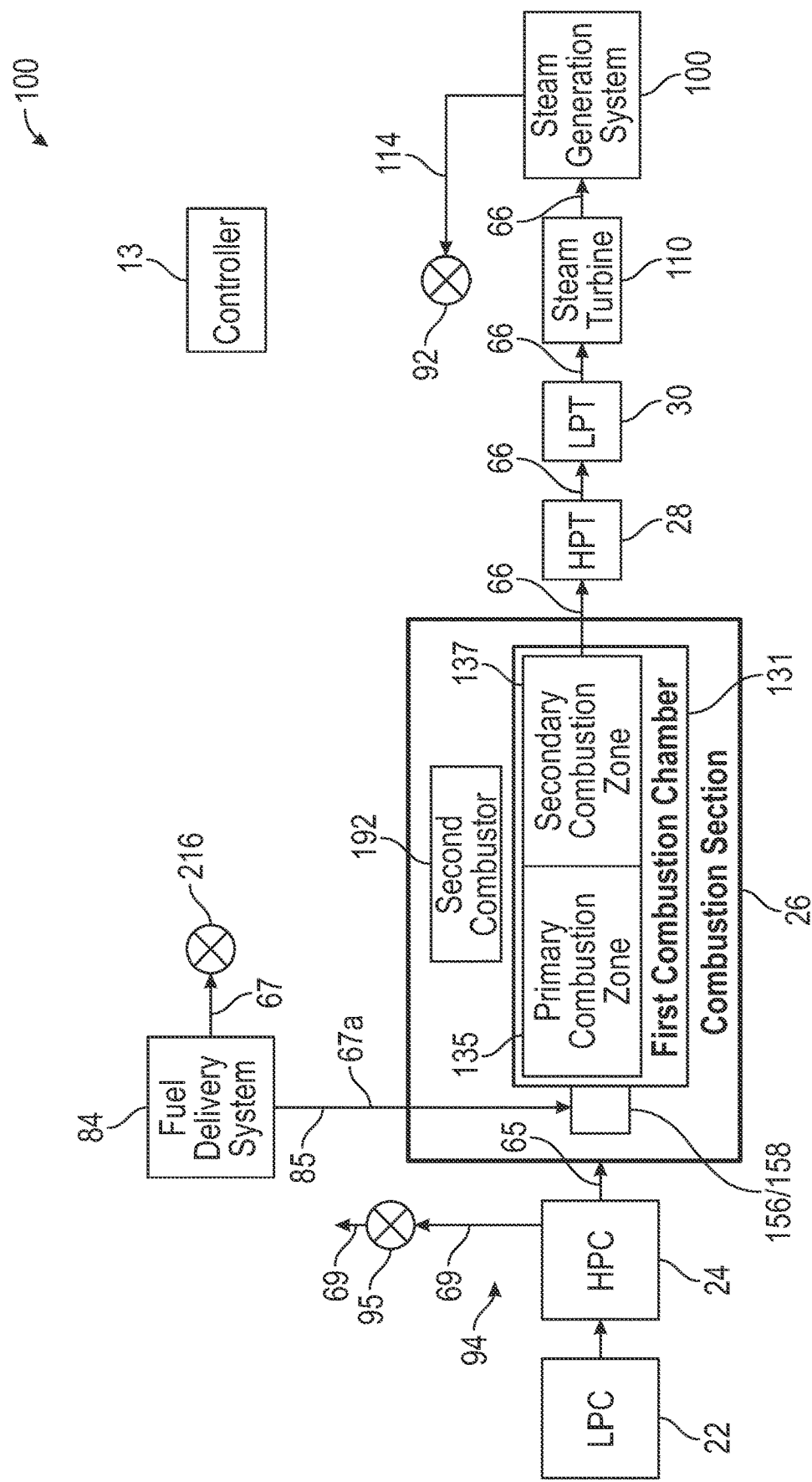
FIG. 8 is a schematic diagram depicting an operation of the gas turbine engine of FIG. 1 during a non-power augmentation operating state, according to an aspect of the present disclosure.

FIG. 8 is a schematic diagram depicting an operation of the gas turbine engine 10 during a non-power-augmentation operating state in which the steam 114 is not provided to the second combustor 192 or to the steam turbine 110, according to an aspect of the present disclosure. The non-power-augmentation operating state of the gas turbine engine 10 in FIG. 8 may be the idle operating state, or may be the non-idle operating state in which thrust augmentation is not being performed and therefore, the steam 114 is not being provided to either the second combustor 192 or to the steam turbine 110. Generally, in the non-power-augmentation operating state, although the steam generating system 100 may be operating normally to generate the steam 114 (FIG. 2), the second combustor 192 and the steam turbine 110 are generally idle and not operating. As shown in FIG. 8, and as was described above with regard to FIG. 1 to FIG. 3, during operation of the gas turbine engine 10, compressed air 65 is provided to the combustion section 26 from the HPC 24. The compressor bleed air system 94 may be operational and may bleed-off some of the compressed air 65 via the compressor bleed air valve 95 to provide the compressor bleed air 69 to various other systems (other than to the second combustor 192). However, during the non-power-augmentation operating state, the compressor bleed air 69 is not provided to the second combustor 192. A first flow of the fuel 67a is provided by the fuel delivery system 84 to the swirler assemblies 156 via the first fuel nozzle 158. The second combustor fuel valve 216 may also be closed off so as not to provide a second flow of fuel 67b to the second combustor 192. The fuel-air mixture 191 (FIG. 3) is injected into the first combustion chamber 131 of the first combustor 125 and is ignited and burned to generate the combustion gases 66 that flow to the HPT 28 and the LPT 30. The combustion gases 66 flow through the steam generation system 100, and then through the exhaust nozzles 32 (FIG. 1 and FIG. 2). During the non-power-augmentation operating state, the steam generating system 100 may be generating the steam 114, but the steam control valve 92 is closed so as not to provide the steam 114 to either the steam turbine 110 or to the second combustor 192. Each of the foregoing operations is controlled by the controller 13 (FIG. 1).

Figure 9:
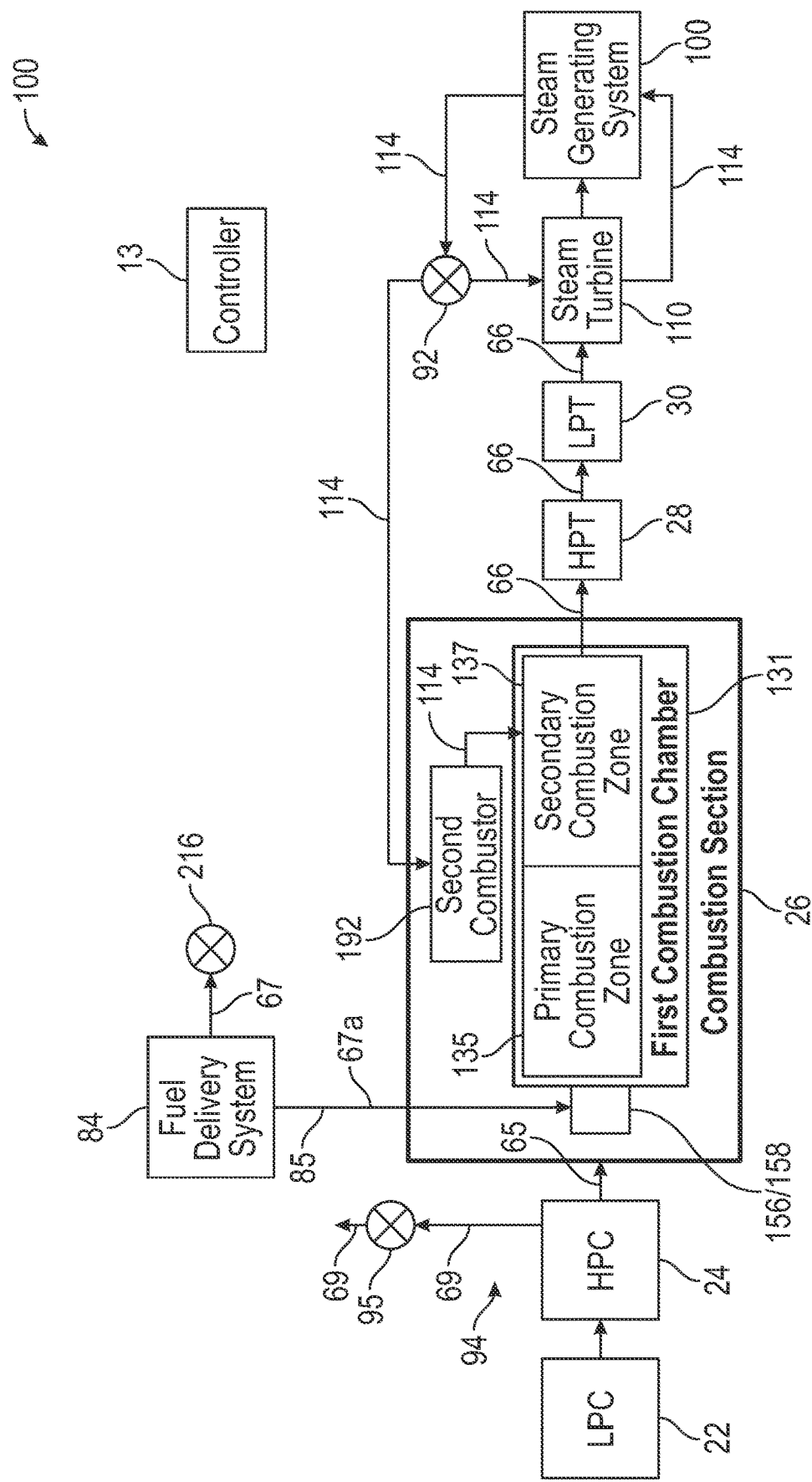
FIG. 9 is a schematic diagram depicting an operation of the gas turbine engine of FIG. 1 during a non-idle operating state, and, during a power-augmentation operating state when the steam generating system is operational to generate the steam at a first steam generating level, according to an aspect of the present disclosure.

FIG. 9 is a schematic diagram depicting an operation of the gas turbine engine 10 during a non-idle operating state, and during a power-augmentation operating state when the steam generating system 100 is operational to generate the steam 114 at a first steam generating level, according to an aspect of the present disclosure. The first steam generating level generally refers to the steam generating system 100 operating normally so as to generate a sufficient amount of the steam 114 to be capable of normally operating the steam turbine 110 at, or near, full capability to provide power or thrust augmentation, and to operate the second combustor 192 normally to provide power or thrust augmentation. In other words, the steam generating system 100 is operating without any appreciable loss of steam generating capability, even though some small loss of steam generating capability may be present within the steam generating system 100. In FIG. 9, the first combustor 125 operates normally as described above, albeit at the non-idle operating state rather than at the idle operating state. As for the second combustor 192, while operating at the non-idle operating state, and, when power or thrust augmentation may be desired for the combustion section 26, the controller 13 controls the steam generating system 100 to generate the steam 114, and controls the steam control valve 92 so as to provide the flow of the steam 114 to the second combustor 192 (shown schematically by an arrow connecting the steam control valve 92 and the second combustor 192), and, to the steam turbine 110. As was described above for the FIG. 4 aspect, for example, the steam 114 is provided to the second combustor plenum 210 via the combustor steam supply line 98. The steam 114 flows through the openings 212 in the second combustor liner 196 into the second combustion chamber 198, and, then from the second combustion chamber 198 into the secondary combustion zone 137 of the first combustion chamber 131 via the outlet 199. At the same time, the controller 13 controls the compressor bleed air valve 95 to be closed so as to disable the compressor bleed air system 94 from providing the flow of compressor bleed air 69 to the second combustor plenum 210. The controller 13 also controls the second combustor fuel valve 216 to be in a closed state so as to disable the second flow of fuel 67b from flowing to the second combustion chamber 198.

Thus, in the FIG. 9 aspect, power or thrust augmentation can be achieved by supplying the flow of the steam 114 to both the steam turbine 110 and to the second combustor 192.

Figure 10:
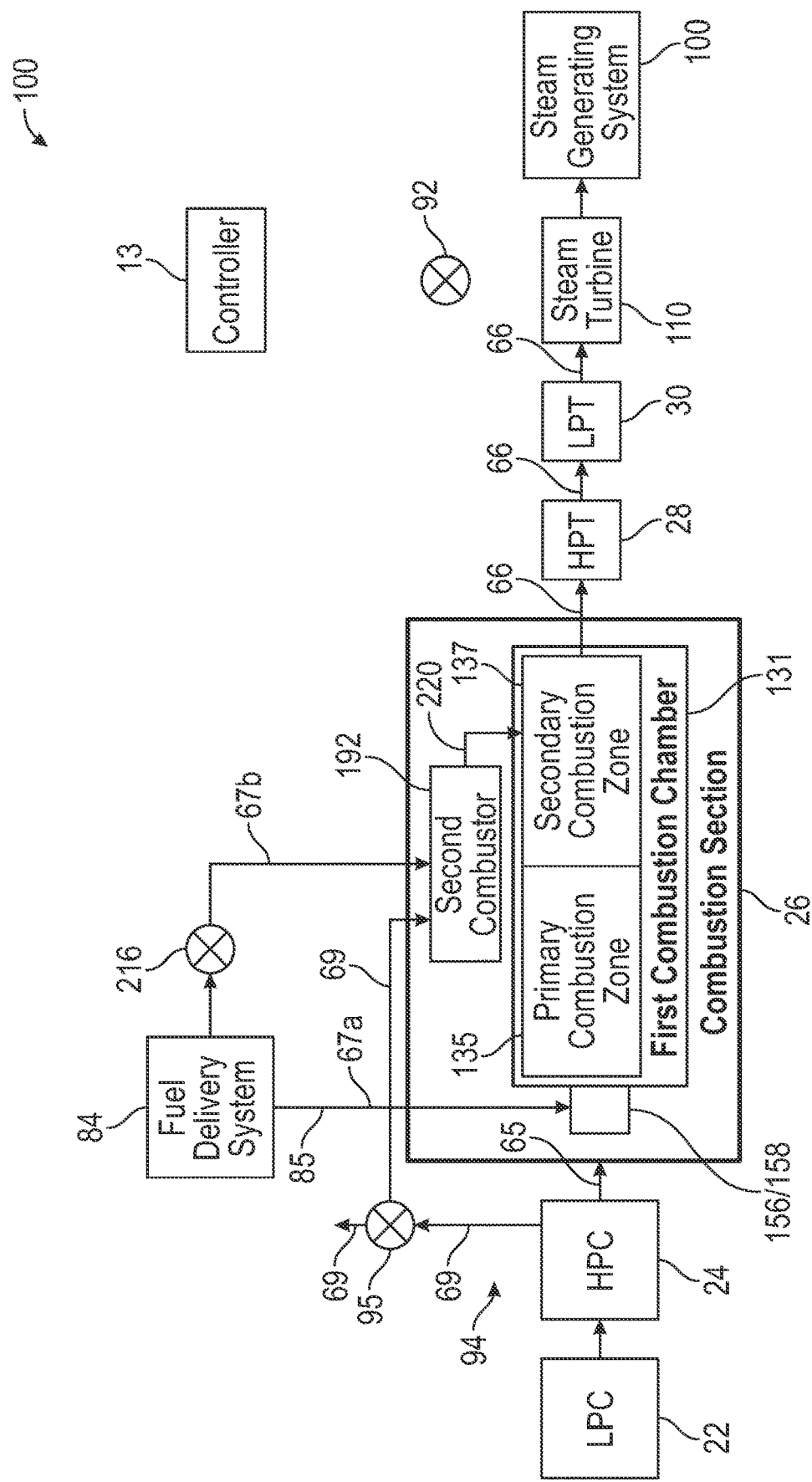
FIG. 10 is a schematic diagram depicting an operation of the gas turbine engine of FIG. 1 during a non-idle operating state, and during a power-augmentation operating state, but with a total loss of steam generation by the steam generating system, according to an aspect of the present disclosure.

FIG. 10 is a schematic diagram depicting an operation of the gas turbine engine 10 during a non-idle operating state, and during a power-augmentation operating state, but with a total loss of steam generation capability by the steam generating system 100, according to an aspect of the present disclosure. Here, a total loss of steam generation capability is intended to mean that the steam generating system 100 is inoperable to generate the steam 114 (e.g., not sufficient water 111 in the boiler 102) and has been shut down by the controller 13, or, that the steam generating system 100 may only be capable of generating a small amount of steam, but, the generated amount is significantly deficient so as to not be capable of operating the steam turbine 110 or to provide power augmentation via the steam 114 being provided to the second combustor 192.

In FIG. 10, as with the FIG. 8 and FIG. 9 aspects, the first combustor 125 (FIG. 3) operates normally as described above, albeit at the non-idle operating state rather than at the idle operating state. As for the second combustor 192, while the gas turbine engine 10 is operating at the non-idle operating state, and, when power augmentation may be desired for the combustion section 26, but, the steam generating system 100 has a total loss of steam generation capability, the controller 13 controls the compressor bleed air valve 95 to be opened so as to provide the flow of the compressor bleed air 69 to the second combustor 192, and the controller 13 also controls the second combustor fuel valve 216 to be open so as to provide the second flow of fuel 67b to the second combustor 192. In the meantime, since the steam generating system 100 is not generating the steam 114 (shown by the absence of the arrow labeled with the steam 114 leading from the steam generating system 100 to the steam control valve 92), the controller 13 controls the steam control valve 92 to be in a closed state.

As was described above for FIG. 4, in the case when the second flow of fuel 67b and the flow of the compressor bleed air 69 are provided to the second combustor 192, the flow of the compressor bleed air 69 flows into the second combustor plenum 210, and, then through the openings 212 into the second combustion chamber 198. The second flow of fuel 67b is injected into the second combustion chamber 198 and mixes with the compressor bleed air 69 to generate the fuel-air mixture 218. The fuel-air mixture 218 is ignited by the spark from the ignitor 202 to generate the first combustion products 220. The first combustion products 220 then flow through the outlet 199 into the secondary combustion zone 137 of the first combustion chamber 131. Thus, by adding the first combustion products 220 to mix with the combustion gases 66, the power (or thrust) augmentation can be obtained, even though the steam generating system 100 has a total loss of steam generation capability.

Figure 11:
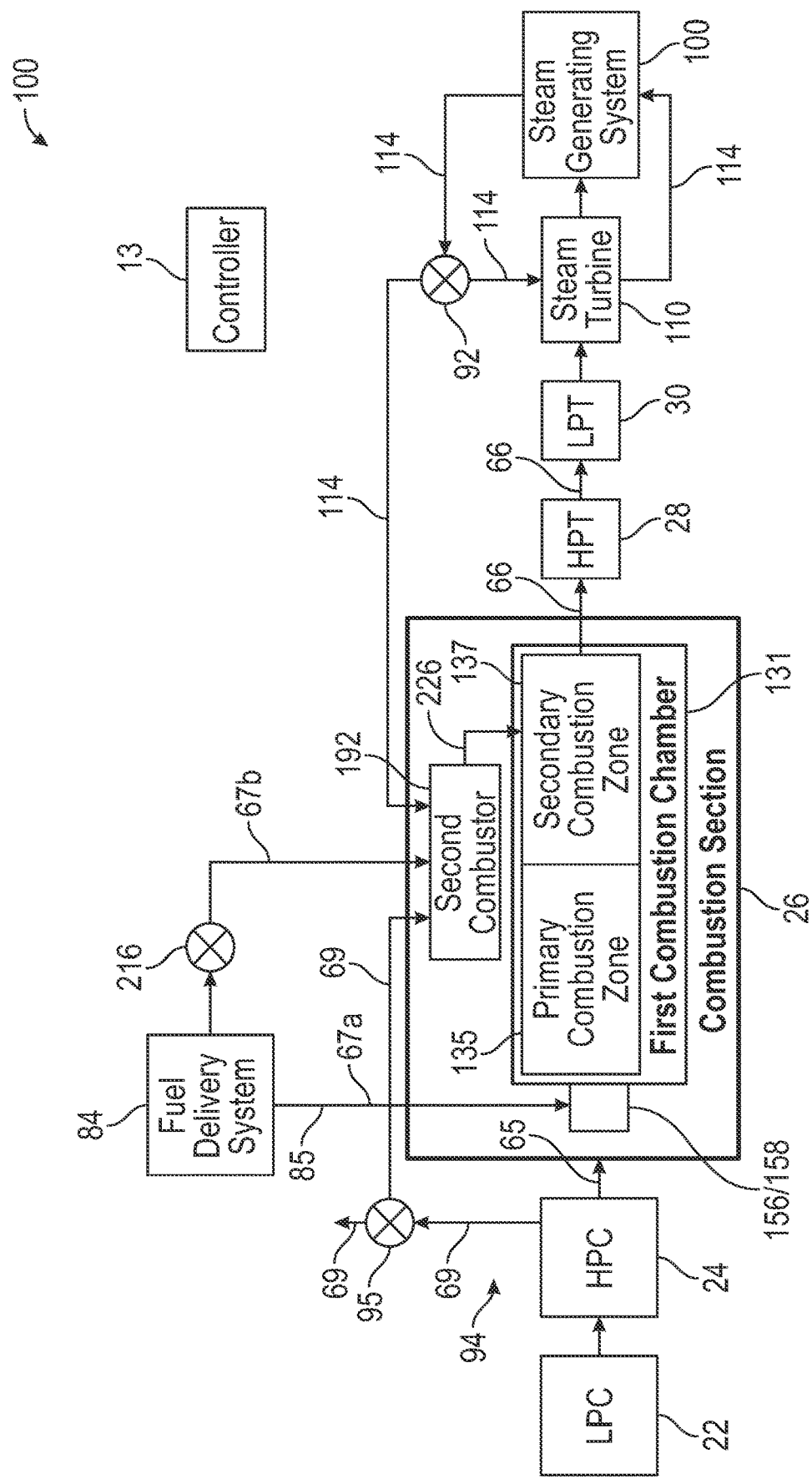
FIG. 11 is a schematic diagram depicting an operation of the gas turbine engine of FIG. 1 during a non-idle operating state, and during a power-augmentation operating state, but with a partial loss of steam generation by the steam generating system, according to an aspect of the present disclosure.

FIG. 11 is a schematic diagram depicting an operation of the gas turbine engine 10 during a non-idle operating state, and during a power-augmentation operating state, but with the steam generating system 100 operating to generate steam at a second steam generating level less than the first steam generating level. The second steam generating level refers to a case when the steam generating system 100 has suffered a partial, but significant, loss of steam generating capability such that the steam generating system 100 is operable to generate the steam 114, but, at a diminished capacity (e.g., at fifty percent or less capacity). That is, the steam generating system 100 is capable of operating the steam turbine 110 at about half of a normal full power capability. In FIG. 11, as with the FIG. 8, FIG. 9, and FIG. 10 aspects, the first combustor 125 operates normally as described above, albeit at the non-idle operating state rather than at the idle operating state. As for the second combustor 192, while operating at the non-idle operating state, and, when power or thrust augmentation may be desired for the combustion section 26, but, the steam generating system 100 has a partial loss of steam generation capability, the controller 13 controls the steam control valve 92 to be opened so as to provide the flow of the steam 114 (albeit, a diminished flow of the steam 114) to the second combustor 192 and to the steam turbine 110. The controller 13 further controls the compressor bleed air valve 95 to be opened so as to provide the flow of the compressor bleed air 69 to the second combustor 192, and the controller 13 also controls the second combustor fuel valve 216 to be open so as to provide the second flow of fuel 67b to the second combustor 192.

As was described above with regard to FIG. 4, the flow of the compressor bleed air 69 flows into the second combustor plenum 210 via the compressor bleed air duct 97, and the (diminished flow of) steam 114 flows into the second combustor plenum 210 via the combustor steam supply line 98. The compressor bleed air 69 and the steam 114 mix together within the second combustor plenum 210 to generate the steam-air mixture 222. The steam-air mixture 222 flows through the openings 212 into the second combustion chamber 198. At the same time, the second flow of fuel 67b is injected into the second combustion chamber 198 by the second fuel nozzle 200, and the fuel 67b mixes with the steam-air mixture 222 within the second combustion chamber 198 to generate the steam-air-fuel mixture 224. The steam-air-fuel mixture 224 is ignited by the ignitor 202 and burned within the second combustion chamber 198 to generate the second combustion products 226. The second combustion products 226 flow through the outlet 199 into the secondary combustion zone 137 of the first combustion chamber 131 to mix with the combustion gases 66 (FIG. 3). Thus, by adding the second combustion products 226 to mix with the combustion gases 66, the power (or thrust) augmentation can be obtained, even though the steam generating system 100 has a partial loss of steam generation capability.

Figure 12:
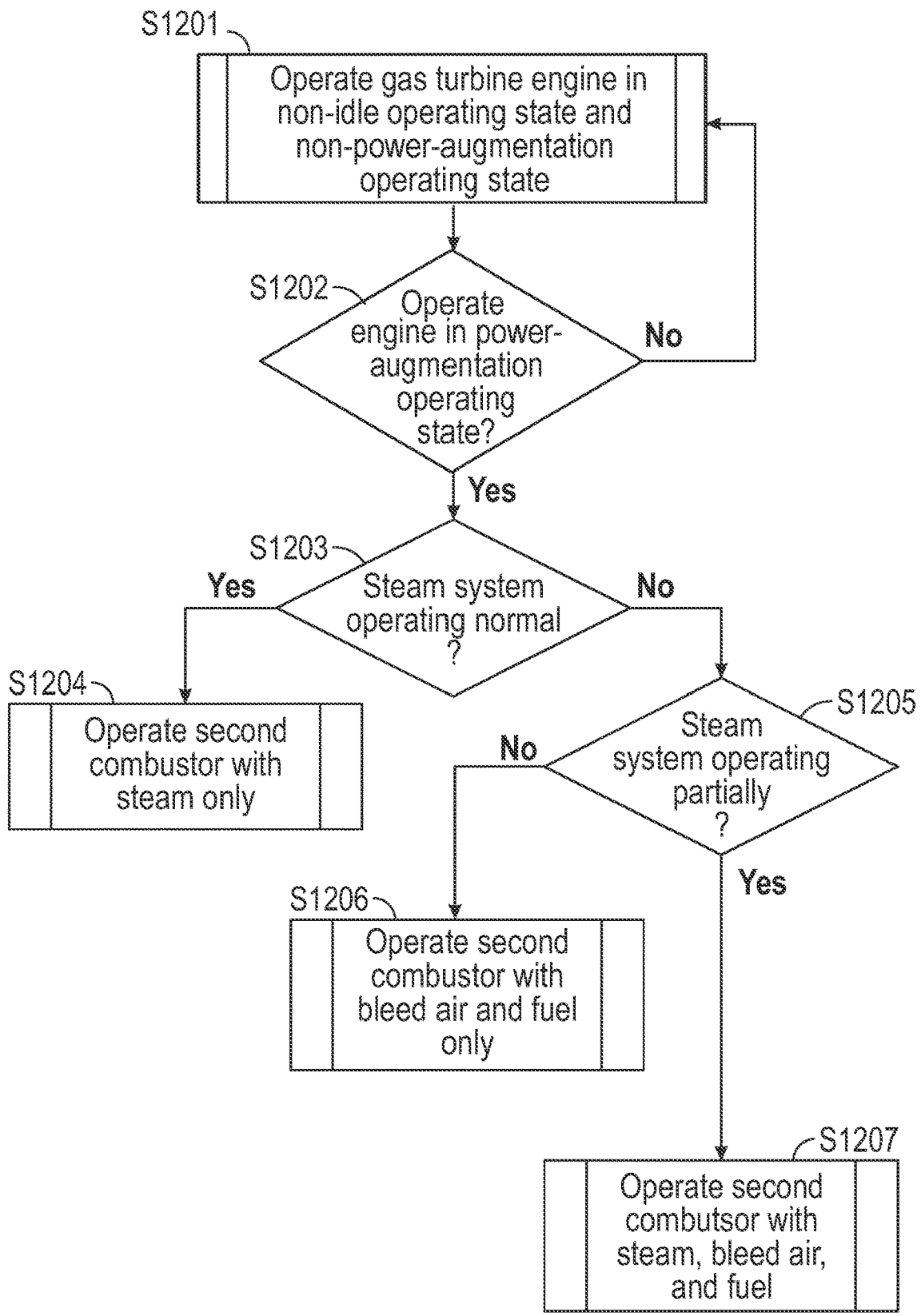
FIG. 12 is a flowchart of process steps for a method of operating the gas turbine engine of FIG. 1, according to an aspect of the present disclosure.

FIG. 12 is a flowchart of process steps for a method of operating the gas turbine engine 10, according to an aspect of the present disclosure. The method of FIG. 12 can be implemented in the gas turbine engine 10 with regard to the aspects described above for FIG. 1 to FIG. 11. In step S1201, the gas turbine engine 10 is operated in the non-idle operating state and in the non-power-augmentation operating state. The operation of the gas turbine engine 10 in the non-idle operating state and in the non-power-augmentation operating state may correspond to the description above. In step S1202, a determination is made, by the controller 13 (FIG. 1) while operating in the non-idle operating state and in the non-power-augmentation operating state, whether or not the gas turbine engine 10 is commanded to operate in the power-augmentation operating state so as to provide power (or thrust) augmentation. The controller 13 may be notified by an avionics system within the aircraft of a power increase above, for example, ten percent of the full power capability of the gas turbine engine 10, or above thirty percent of the full power capability of the gas turbine engine 10. The controller 13 may also utilize, as part of the determination, avionics signals indicating a flight status of the aircraft, such as whether the aircraft is in a take-off state, or a climb-out state, or if the aircraft is in a cruise state, or in a landing approach state. If the determination in step S1202 is NO, then, the gas turbine engine 10 continues to operate in the non-idle operating state and in the non-power-augmentation operating state of step S1201.

On the other hand, if the determination in step S1202 is YES, then another determination is made in step S1203 whether or not the steam generating system 100 (FIG. 1, FIG. 2) is operating normally. That is, the controller 13 monitors the status of the steam generating system 100 during the operation of the gas turbine engine 10, and the controller 13 determines whether the steam generating system 100 is operating normally to generate a sufficient amount of the steam 114 to operate the steam turbine 110. If the determination in step S1203 is YES, then, in step S1204, the controller 13 controls the gas turbine engine 10 to operate as described above with regard to FIG. 9 so as to provide the flow of the steam 114 to the second combustor 192 and to the steam turbine 110.

On the other hand, if the determination in step S1203 is NO (i.e., the steam generating system 100 is not operating normally and is either not producing steam or is producing a diminished capacity of the steam), then, in step S1205, a determination is made by the controller 13 whether the steam generating system 100 is partially operating to generate the steam 114 (i.e., whether there is a partial loss of steam generation capability). If the determination in step S1205 is NO, then, the controller 13 determines that a total loss of steam generation capability has occurred and, in step S1206, controls the gas turbine engine 10 to operate in the manner described above for FIG. 10 by providing the compressor bleed air 69 and the second flow of fuel 67b to the second combustor 192, while disabling the flow of the steam 114 from flowing from the steam generating system 100 to the second combustor 192 and to the steam turbine 110.

When the determination in step S1205 is YES (i.e., there is a partial loss of steam generating capability by the steam generating system 100), then, in step S1207, the controller 13 controls the gas turbine engine 10 to operate in the manner described above with regard to FIG. 11, so as to provide the flow of the compressor bleed air 69, the second flow of fuel 67b, and the steam 114 to the second combustor 192.

Further aspects of the present disclosure are provided by the subject matter of the following clauses.

A gas turbine engine including a compressor section having a compressor bleed air system connected thereto, a steam turbine, a combustion section including a combustor outer casing and a combustor inner casing defining a first combustor pressure plenum therewithin, a first combustor arranged within the combustor outer casing and the combustor inner casing, and having (a) a first combustor outer liner and a first combustor inner liner that define a first combustion chamber having a primary combustion zone and a secondary combustion zone downstream of the primary combustion zone, and (b) at least one swirler assembly, an outer flow passage being defined between the combustor outer casing and the first combustor outer liner, and an inner flow passage being defined between the combustor inner casing and the first combustor inner liner, the first combustor being arranged to receive a flow of compressed air from the compressor section and to provide a flow of the compressed air into the first combustion chamber, and a second combustor arranged within one of the outer flow passage or the inner flow passage, the second combustor having a second combustor casing and a second combustor liner defining a second combustion chamber therewithin, a second combustor plenum being defined between the second combustor casing and the second combustor liner, the second combustion liner having an outlet, the second combustor casing being in fluid communication with the compressor bleed air system to receive a flow of compressor bleed air from the compressor bleed air system into the second combustor plenum, and the outlet providing fluid communication between the second combustion chamber and the first combustion chamber of the first combustor, a first fuel nozzle assembly arranged to provide a first flow of fuel to the at least one swirler assembly of the first combustor, a second fuel nozzle arranged to provide a second flow of fuel to the second combustion chamber, and a steam generating system arranged to provide a flow of steam to the second combustor plenum and to the steam turbine.

The gas turbine engine according to the preceding clause, wherein the outlet is arranged to direct a flow of steam or a flow of combustion products therefrom in a downstream direction within the secondary combustion zone of the first combustion chamber.

The gas turbine engine according to any preceding clause, wherein the compressor bleed air system includes a bleed air valve that controls the flow of the compressor bleed air to the second combustor plenum, and the steam generating system includes a steam control valve that controls the flow of steam to the second combustor plenum.

The gas turbine engine according to any preceding clause, wherein the second combustor includes (i) a plurality of second combustor liners, each of the plurality of second combustor liners defining a respective second combustion chamber that each have a respective outlet in fluid communication with the secondary combustion zone of the first combustion chamber, and (ii) a plurality of second fuel nozzles, respective ones of the plurality of second fuel nozzles being arranged to provide the second flow of fuel to a respective one of the plurality of second combustion chambers.

The gas turbine engine according to any preceding clause, wherein the steam generating system is arranged downstream of an exhaust section of the gas turbine engine, and utilizes exhaust gases from the exhaust section to generate steam within a boiler.

The gas turbine engine according to any preceding clause, wherein the steam generating system further includes a condenser and a separator that utilize the exhaust gases to recover water from the exhaust gases and to replenish water within the boiler.

The gas turbine engine according to any preceding clause, wherein the outlet of the second combustor liner is in fluid communication with the secondary combustion zone of the first combustion chamber.

The gas turbine engine according to any preceding clause, wherein the outlet is arranged to extend through at least one dilution opening in one of the first combustor outer liner or the first combustor inner liner.

The gas turbine engine according to any preceding clause, wherein the combustor outer casing and the combustor inner casing extend annularly about a combustor centerline axis, the first combustor is an annular combustor extending annularly about the combustor centerline axis, and the second combustor is a localized combustor that does not extend annularly about the combustor centerline axis.

The gas turbine engine according to any preceding clause, wherein the second combustor is a partial-annular combustor that extends partially annularly about the combustor centerline axis.

The gas turbine engine according to any preceding clause, wherein the second combustor casing surrounds the second combustor liner.

The gas turbine engine according to any preceding clause, wherein the second combustor liner is a trapped vortex combustor liner.

The gas turbine engine according to any preceding clause, wherein the second combustor liner includes a plurality of openings therethrough providing fluid communication between the second combustor plenum and the second combustion chamber.

The gas turbine engine according to any preceding clause, wherein, in a non-idle operating state and in a power-augmentation operating state of the gas turbine engine, and, in a case when the steam generating system is operational to generate the steam at a first steam generating level, (i) the flow of steam is provided by the steam generating system to the second combustor plenum, to the second combustion chamber via the plurality of openings, and to the secondary combustion zone of the first combustion chamber, (ii) the compressor bleed air system is disabled from providing compressor bleed air to the second combustor plenum, and (iii) the second fuel nozzle is disabled from providing the second flow of fuel to the second combustion chamber.

The gas turbine engine according to any preceding clause, wherein, in the non-idle operating state and in the power-augmentation operating state of the gas turbine engine, and, in a case when the steam generating system is operational to generate steam at a second steam generating level less than the first steam generating level, (iv) the steam is provided by the steam generating system to the second combustor plenum, and to the second combustion chamber via the plurality of openings, (v) the compressor bleed air system is enabled and provides the flow of the compressor bleed air to the second combustor plenum, and to the second combustion chamber via the plurality of openings, (vi) the second fuel nozzle is enabled and provides the second flow of fuel to the second combustion chamber, the fuel, the compressor bleed air, and the steam mixing within the second combustion chamber to form a steam-air-fuel mixture, and (vii) the steam-air-fuel mixture is ignited and burned within the second combustion chamber to generate combustion products that are provided to the secondary combustion zone of the first combustion chamber via the outlet.

The gas turbine engine according to any preceding clause, wherein, in the non-idle operating state and in the power-augmentation operating state of the gas turbine engine, and, in a case when the steam generating system is not generating the steam, (viii) the steam generating system is disabled from providing steam to the second combustor plenum, (ix) the compressor bleed air system is enabled to provide the flow of compressor bleed air to the second combustor plenum, and the compressor bleed air flows into the second combustion chamber via the plurality of openings, (x) the second fuel nozzle is enabled and provides the second flow of fuel to the second combustion chamber to generate a fuel-air mixture within the second combustion chamber, (xi) the fuel-air mixture is ignited within the second combustion chamber to generate second combustion products, and (xii) the second combustion products are provided from the second combustion chamber to the secondary combustion zone of the first combustion chamber via the outlet.

The gas turbine engine according to any preceding clause, wherein the plurality of openings are arranged to generate a swirled flow of the compressor bleed air within the second combustion chamber.

The gas turbine engine according to any preceding clause, wherein the second combustor liner defines a trapped vortex combustor liner, and the swirled flow is a trapped vortex flow of the compressor bleed air within the trapped vortex combustor liner.

The gas turbine engine according to any preceding clause, wherein the second combustor liner defines an axial-flow second combustion chamber, and the axial-flow second combustor liner includes a dome having a plurality of dome openings extending through the dome.

The gas turbine engine according to any preceding clause, wherein the plurality of dome openings are arranged at a tangential angle, and the second fuel nozzle is arranged at the A gas turbine engine including a compressor section having a compressor bleed air system connected thereto, a steam turbine, a combustion section including a combustor outer casing and a combustor inner casing defining a first combustor pressure plenum therewithin, a first combustor arranged within the combustor outer casing and the combustor inner casing, and having (a) a first combustor outer liner and a first combustor inner liner that define a first combustion chamber having a primary combustion zone and a secondary combustion zone downstream of the primary combustion zone, and (b) at least one swirler assembly, an outer flow passage being defined between the combustor outer casing and the first combustor outer liner, and an inner flow passage being defined between the combustor inner casing and the first combustor inner liner, the first combustor being arranged to receive a flow of compressed air from the compressor section and to provide a flow of the compressed air into the first combustion chamber, and a second combustor arranged within one of the outer flow passage or the inner flow passage, the second combustor having a second combustor casing and a second combustor liner defining a second combustion chamber therewithin, a second combustor plenum being defined between the second combustor casing and the second combustor liner, the second combustion liner having an outlet, the second combustor casing being in fluid communication with the compressor bleed air system to receive a flow of compressor bleed air from the compressor bleed air system into the second combustor plenum, and the outlet providing fluid communication between the second combustion chamber and the first combustion chamber of the first combustor, a first fuel nozzle assembly arranged to provide a first flow of fuel to the at least one swirler assembly of the first combustor, a second fuel nozzle arranged to provide a second flow of fuel to the second combustion chamber, and a steam generating system arranged to provide a flow of steam to the second combustor plenum and to the steam turbine, wherein the second combustor includes (i) a plurality of second combustor liners, each of the plurality of second combustor liners defining a respective second combustion chamber that each have a respective outlet in fluid communication with the secondary combustion zone of the first combustion chamber, and (ii) a plurality of second fuel nozzles, respective ones of the plurality of second fuel nozzles being arranged to provide the second flow of fuel to a respective one of the plurality of second combustion chamber.

The gas turbine engine according to any preceding clause, wherein the compressor bleed air system includes a bleed air valve that controls the flow of the compressor bleed air to the second combustor plenum, and the steam generating system includes a steam control valve that controls the flow of steam to the second combustor plenum.

The gas turbine engine according to any preceding clause, wherein the steam generating system is arranged downstream of an exhaust section of the gas turbine engine, and utilizes exhaust gases from the exhaust section to generate steam within a boiler.

The gas turbine engine according to any preceding clause, wherein the steam generating system further includes a condenser and a separator that utilize the exhaust gases to recover water from the exhaust gases and to replenish water within the boiler.

The gas turbine engine according to any preceding clause, wherein the outlet of the second combustor liner is in fluid communication with the secondary combustion zone of the first combustion chamber.

The gas turbine engine according to any preceding clause, wherein the outlet is arranged to extend through at least one dilution opening in one of the first combustor outer liner or the first combustor inner liner.

The gas turbine engine according to any preceding clause, wherein the combustor outer casing and the combustor inner casing extend annularly about a combustor centerline axis, the first combustor is an annular combustor extending annularly about the combustor centerline axis, and the second combustor is a localized combustor that does not extend annularly about the combustor centerline axis.

The gas turbine engine according to any preceding clause, wherein the second combustor is a partial-annular combustor that extends partially annularly about the combustor centerline axis.

The gas turbine engine according to any preceding clause, wherein the second combustor casing surrounds the second combustor liner.

The gas turbine engine according to any preceding clause, wherein the second combustor liner is a trapped vortex combustor liner.

The gas turbine engine according to any preceding clause, wherein the second combustor liner includes a plurality of openings therethrough providing fluid communication between the second combustor plenum and the second combustion chamber.

The gas turbine engine according to any preceding clause, wherein, in a non-idle operating state and in a power-augmentation operating state of the gas turbine engine, and, in a case when the steam generating system is operational to generate the steam at a first steam generating level, (i) the flow of steam is provided by the steam generating system to the second combustor plenum, to the second combustion chamber via the plurality of openings, and to the secondary combustion zone of the first combustion chamber, (ii) the compressor bleed air system is disabled from providing compressor bleed air to the second combustor plenum, and (iii) the second fuel nozzle is disabled from providing the second flow of fuel to the second combustion chamber.

The gas turbine engine according to any preceding clause, wherein, in the non-idle operating state and in the power-augmentation operating state of the gas turbine engine, and, in a case when the steam generating system is operational to generate steam at a second steam generating level less than the first steam generating level, (iv) the steam is provided by the steam generating system to the second combustor plenum, and to the second combustion chamber via the plurality of openings, (v) the compressor bleed air system is enabled and provides the flow of the compressor bleed air to the second combustor plenum, and to the second combustion chamber via the plurality of openings, (vi) the second fuel nozzle is enabled and provides the second flow of fuel to the second combustion chamber, the fuel, the compressor bleed air, and the steam mixing within the second combustion chamber to form a steam-air-fuel mixture, and (vii) the steam-air-fuel mixture is ignited and burned within the second combustion chamber to generate combustion products that are provided to the secondary combustion zone of the first combustion chamber via the outlet.

The gas turbine engine according to any preceding clause, wherein, in the non-idle operating state and in the power-augmentation operating state of the gas turbine engine, and, in a case when the steam generating system is not generating the steam, (viii) the steam generating system is disabled from providing steam to the second combustor plenum, (ix) the compressor bleed air system is enabled to provide the flow of compressor bleed air to the second combustor plenum, and the compressor bleed air flows into the second combustion chamber via the plurality of openings, (x) the second fuel nozzle is enabled and provides the second flow of fuel to the second combustion chamber to generate a fuel-air mixture within the second combustion chamber, (xi) the fuel-air mixture is ignited within the second combustion chamber to generate second combustion products, and (xii) the second combustion products are provided from the second combustion chamber to the secondary combustion zone of the first combustion chamber via the outlet.

The gas turbine engine according to any preceding clause, wherein the plurality of openings are arranged to generate a swirled flow of the compressor bleed air within the second combustion chamber.

The gas turbine engine according to any preceding clause, wherein the second combustor liner defines a trapped vortex combustor liner, and the swirled flow is a trapped vortex flow of the compressor bleed air within the trapped vortex combustor liner.

The gas turbine engine according to any preceding clause, wherein the second combustor liner defines an axial-flow second combustion chamber, and the axial-flow second combustor liner includes a dome having a plurality of dome openings extending through the dome.

The gas turbine engine according to any preceding clause, wherein the plurality of dome openings are arranged at a tangential angle, and the second fuel nozzle is arranged at the tangential angle.

A method of operating a gas turbine engine including a compressor section having a compressor bleed air system connected thereto, a steam turbine, a combustion section including a combustor outer casing and a combustor inner casing defining a first combustor pressure plenum therewithin, a first combustor arranged within the combustor outer casing and the combustor inner casing, and having (a) a first combustor outer liner and a first combustor inner liner that define a first combustion chamber having a primary combustion zone and a secondary combustion zone downstream of the primary combustion zone, and (b) at least one swirler assembly, an outer flow passage being defined between the combustor outer casing and the first combustor outer liner, and an inner flow passage being defined between the combustor inner casing and the first combustor inner liner, the first combustor being arranged to receive a flow of compressed air from the compressor section and to provide a flow of the compressed air into the first combustion chamber, and a second combustor arranged within one of the outer flow passage or the inner flow passage, the second combustor having a second combustor casing and a second combustor liner defining a second combustion chamber therewithin, a second combustor plenum being defined between the second combustor casing and the second combustor liner, the second combustion liner having an outlet, the second combustor casing being in fluid communication with the compressor bleed air system to receive a flow of compressor bleed air from the compressor bleed air system into the second combustor plenum, and the outlet providing fluid communication between the second combustion chamber and the first combustion chamber of the first combustor, a first fuel nozzle assembly arranged to provide a first flow of fuel to the at least one swirler assembly of the first combustor, a second fuel nozzle arranged to provide a second flow of fuel to the second combustion chamber, and a steam generating system arranged to provide a flow of steam to the second combustor plenum and to the steam turbine. The method includes operating the gas turbine engine in a non-idle operating state and in a power-augmentation operating state of the gas turbine engine, and, in a case when the steam generating system is operational to generate the steam at a first steam generating level, (i) the flow of steam is provided by the steam generating system to the second combustor plenum, to the second combustion chamber via the plurality of openings, and to the secondary combustion zone of the first combustion chamber, (ii) the compressor bleed air system is disabled from providing compressor bleed air to the second combustor plenum, and (iii) the second fuel nozzle is disabled from providing the second flow of fuel to the second combustion chamber.

The method according to the preceding clause, wherein, in a case when the steam generating system is operational to generate steam at a second steam generating level less than the first steam generating level, (iv) the steam is provided by the steam generating system to the second combustor plenum, and to the second combustion chamber via the plurality of openings, (v) the compressor bleed air system is enabled and provides the flow of the compressor bleed air to the second combustor plenum, and to the second combustion chamber via the plurality of openings, (vi) the second fuel nozzle is enabled and provides the second flow of fuel to the second combustion chamber, the fuel, the compressor bleed air, and the steam mixing within the second combustion chamber to form a steam-air-fuel mixture, and (vii) the steam-air-fuel mixture is ignited and burned within the second combustion chamber to generate combustion products that are provided to the secondary combustion zone of the first combustion chamber via the outlet.

The method according to any preceding clause, wherein, in a case when the steam generating system is not generating the steam, (viii) the steam generating system is disabled from providing steam to the second combustor plenum, (ix) the compressor bleed air system is enabled to provide the flow of compressor bleed air to the second combustor plenum, and the compressor bleed air flows into the second combustion chamber via the plurality of openings, (x) the second fuel nozzle is enabled and provides the second flow of fuel to the second combustion chamber to generate a fuel-air mixture within the second combustion chamber, (xi) the fuel-air mixture is ignited within the second combustion chamber to generate second combustion products, and (xii) the second combustion products are provided from the second combustion chamber to the secondary combustion zone of the first combustion chamber via the outlet.

The method according to any preceding clause, wherein the outlet is arranged to direct a flow of steam or a flow of combustion products therefrom in a downstream direction within the secondary combustion zone of the first combustion chamber.

The method according to any preceding clause, wherein the compressor bleed air system includes a bleed air valve that controls the flow of the compressor bleed air to the second combustor plenum, and the steam generating system includes a steam control valve that controls the flow of steam to the second combustor plenum.

The method according to any preceding clause, wherein the second combustor includes (i) a plurality of second combustor liners, each of the plurality of second combustor liners defining a respective second combustion chamber that each have a respective outlet in fluid communication with the secondary combustion zone of the first combustion chamber, and (ii) a plurality of second fuel nozzles, respective ones of the plurality of second fuel nozzles being arranged to provide the second flow of fuel to a respective one of the plurality of second combustion chambers.

The method according to any preceding clause, wherein the steam generating system is arranged downstream of an exhaust section of the gas turbine engine, and utilizes exhaust gases from the exhaust section to generate steam within a boiler.

The method according to any preceding clause, wherein the steam generating system further includes a condenser and a separator that utilize the exhaust gases to recover water from the exhaust gases and to replenish water within the boiler.

The method according to any preceding clause, wherein the outlet of the second combustor liner is in fluid communication with the secondary combustion zone of the first combustion chamber.

The method according to any preceding clause, wherein the outlet is arranged to extend through at least one dilution opening in one of the first combustor outer liner or the first combustor inner liner.

The method according to any preceding clause, wherein the combustor outer casing and the combustor inner casing extend annularly about a combustor centerline axis, the first combustor is an annular combustor extending annularly about the combustor centerline axis, and the second combustor is a localized combustor that does not extend annularly about the combustor centerline axis.

The method according to any preceding clause, wherein the second combustor is a partial-annular combustor that extends partially annularly about the combustor centerline axis.

The method according to any preceding clause, wherein the second combustor casing surrounds the second combustor liner.

The method according to any preceding clause, wherein the second combustor liner is a trapped vortex combustor liner.

The method according to any preceding clause, wherein the second combustor liner includes a plurality of openings therethrough providing fluid communication between the second combustor plenum and the second combustion chamber.

The method according to any preceding clause, wherein the plurality of openings are arranged to generate a swirled flow of the compressor bleed air within the second combustion chamber.

The method according to any preceding clause, wherein the second combustor liner defines a trapped vortex combustor liner, and the swirled flow is a trapped vortex flow of the compressor bleed air within the trapped vortex combustor liner.

The method according to any preceding clause, wherein the second combustor liner defines an axial-flow second combustion chamber, and the axial-flow second combustor liner includes a dome having a plurality of dome openings extending through the dome.

The method according to any preceding clause, wherein the plurality of dome openings are arranged at a tangential angle, and the second fuel nozzle is arranged at the tangential angle.

A method of operating a combustor of a gas turbine engine in a non-idle operating state and in a power-augmentation operating state of the gas turbine engine, the gas turbine engine including a combustion section having a first combustor and a second combustor in fluid communication with a combustion chamber of the first combustor, and a steam generating system, the method including, in a case when the steam generating system is operational to generate steam at a first steam generating level, (i) providing a flow of steam by the steam generating system to a second combustor plenum of the second combustor and to a second combustion chamber of the second combustor via a plurality of openings in a second combustor liner, and to a secondary combustion zone of the combustion chamber of the first combustor, (ii) disabling a compressor bleed air system from providing compressor bleed air to the second combustor plenum, and (iii) disabling a second fuel nozzle of the second combustor from providing a second flow of fuel to the second combustion chamber.

The method according to the preceding clause, wherein the method further includes, in a case when the steam generating system is operational to generate steam at a second steam generating level less than the first steam generating level, (iv) providing the steam by the steam generating system to the second combustor plenum, and to the second combustion chamber via the plurality of openings, (v) enabling the compressor bleed air system to provide the flow of the compressor bleed air to the second combustor plenum, and to the second combustion chamber via the plurality of openings, (vi) enabling the second fuel nozzle to provide the second flow of fuel to the second combustion chamber, the fuel, the compressor bleed air, and the steam mixing within the second combustion chamber to form a steam-air-fuel mixture, and (vii) igniting and burning the steam-air-fuel mixture within the second combustion chamber to generate combustion products that are provided to the secondary combustion zone of the first combustion chamber via the outlet.

The method according to any preceding clause, wherein, the method further includes, in a case when the steam generating system is not generating the steam, (viii) disabling the steam generating system from providing steam to the second combustor plenum, (ix) enabling the compressor bleed air system to provide the flow of compressor bleed air to the second combustor plenum, and the compressor bleed air flowing into the second combustion chamber via the plurality of openings, (x) enabling the second fuel nozzle to provide the second flow of fuel to the second combustion chamber to generate a fuel-air mixture within the second combustion chamber, (xi) igniting and burning the fuel-air mixture within the second combustion chamber to generate second combustion products, and (xii) providing the second combustion products from the second combustion chamber to the secondary combustion zone of the first combustion chamber via the outlet.

Although the foregoing description is directed to some exemplary embodiments of the present disclosure, other variations and modifications will be apparent to those skilled in the art, and may be made without departing from the present disclosure. Moreover, features described in connection with one embodiment of the present disclosure may be used in conjunction with other embodiments, even if not explicitly stated above.

We claim:

1. A gas turbine engine comprising:
   a compressor section having a compressor bleed air system connected thereto;
   a steam turbine;
   a combustion section, comprising:
      a combustor outer casing and a combustor inner casing defining a first combustor pressure plenum therewithin;
      a first combustor arranged within the combustor outer casing and the combustor inner casing, and having (a) a first combustor outer liner and a first combustor inner liner that define a first combustion chamber having a primary combustion zone and a secondary combustion zone downstream of the primary combustion zone, and (b) at least one swirler assembly, an outer flow passage being defined between the combustor outer casing and the first combustor outer liner, and an inner flow passage being defined between the combustor inner casing and the first combustor inner liner, the first combustor being arranged to receive a flow of compressed air from the compressor section and to provide a flow of the compressed air into the first combustion chamber; and
      a second combustor arranged within one of the outer flow passage or the inner flow passage, the second combustor having a second combustor casing and a second combustor liner defining a second combustion chamber therewithin, a second combustor plenum being defined between the second combustor casing and the second combustor liner, the second combustion liner having an outlet, the second combustor casing being in fluid communication with the compressor bleed air system to receive a flow of compressor bleed air from the compressor bleed air system into the second combustor plenum, and the outlet providing fluid communication between the second combustion chamber and the first combustion chamber of the first combustor;
   a first fuel nozzle arranged to provide a first flow of fuel to the at least one swirler assembly of the first combustor;
   a second fuel nozzle arranged to provide a second flow of fuel to the second combustion chamber; and
   a steam generating system arranged to provide a flow of steam to the second combustor plenum and to the steam turbine.

2. The gas turbine engine according to claim 1, wherein the outlet is arranged to direct a flow of steam or a flow of combustion products therefrom in a downstream direction within the secondary combustion zone of the first combustion chamber.

3. The gas turbine engine according to claim 1, wherein the compressor bleed air system includes a bleed air valve that controls the flow of the compressor bleed air to the second combustor plenum, and the steam generating system includes a steam control valve that controls the flow of steam to the second combustor plenum.

4. The gas turbine engine according to claim 1, wherein the second combustor includes (i) a plurality of second combustor liners, each of the plurality of second combustor liners defining a respective one of a plurality of second combustion chamber that each have a respective outlet in fluid communication with the secondary combustion zone of the first combustion chamber, and (ii) a plurality of second fuel nozzles, respective ones of the plurality of second fuel nozzles being arranged to provide the second flow of fuel to a respective one of the plurality of second combustion chambers.

5. The gas turbine engine according to claim 1, wherein the steam generating system is arranged downstream of an exhaust section of the gas turbine engine, and utilizes exhaust gases from the exhaust section to generate steam within a boiler.

6. The gas turbine engine according to claim 5, wherein the steam generating system further includes a condenser and a separator that utilize the exhaust gases to recover water from the exhaust gases and to replenish water within the boiler.

7. The gas turbine engine according to claim 1, wherein the outlet of the second combustor liner is in fluid communication with the secondary combustion zone of the first combustion chamber.

8. The gas turbine engine according to claim 7, wherein the outlet is arranged to extend through at least one dilution opening in one of the first combustor outer liner or the first combustor inner liner.

9. The gas turbine engine according to claim 1, wherein the combustor outer casing and the combustor inner casing extend annularly about a combustor centerline axis, the first combustor is an annular combustor extending annularly about the combustor centerline axis, and the second combustor is a localized combustor that does not extend annularly about the combustor centerline axis.

10. The gas turbine engine according to claim 9, wherein the second combustor is a partial-annular combustor that extends partially annularly about the combustor centerline axis.

11. The gas turbine engine according to claim 1, wherein the second combustor casing surrounds the second combustor liner.

12. The gas turbine engine according to claim 11, wherein the second combustor liner is a trapped vortex combustor liner.

13. The gas turbine engine according to claim 11, wherein the second combustor liner includes a plurality of openings therethrough providing fluid communication between the second combustor plenum and the second combustion chamber.

14. The gas turbine engine according to claim 13, wherein, in a non-idle operating state and in a power-augmentation operating state of the gas turbine engine, and, in a case when the steam generating system is operational to generate the steam at a first steam generating level, (i) the flow of steam is provided by the steam generating system to the second combustor plenum, to the second combustion chamber via the plurality of openings, and to the secondary combustion zone of the first combustion chamber, (ii) the compressor bleed air system is disabled from providing compressor bleed air to the second combustor plenum, and (iii) the second fuel nozzle is disabled from providing the second flow of fuel to the second combustion chamber.

15. The gas turbine engine according to claim 13, wherein, in a non-idle operating state and in a power-augmentation operating state of the gas turbine engine, and, in a case when the steam generating system is operational to generate steam at a second steam generating level less than a first steam generating level, (i) the steam is provided by the steam generating system to the second combustor plenum, and to the second combustion chamber via the plurality of openings, (ii) the compressor bleed air system is enabled and provides the flow of the compressor bleed air to the second combustor plenum, and to the second combustion chamber via the plurality of openings, (iii) the second fuel nozzle is enabled and provides the second flow of fuel to the second combustion chamber where the second flow of fuel, the compressor bleed air, and the steam mix within the second combustion chamber to form a steam-air-fuel mixture, and (iv) the steam-air-fuel mixture is ignited and burned within the second combustion chamber to generate combustion products that are provided to the secondary combustion zone of the first combustion chamber via the outlet.

16. The gas turbine engine according to claim 13, wherein, in a non-idle operating state and in a power-augmentation operating state of the gas turbine engine, and, in a case when the steam generating system is not generating the steam, (i) the steam generating system is disabled from providing steam to the second combustor plenum, (ii) the compressor bleed air system is enabled to provide the flow of compressor bleed air to the second combustor plenum, and the compressor bleed air flows into the second combustion chamber via the plurality of openings, (iii) the second fuel nozzle is enabled and provides the second flow of fuel to the second combustion chamber to generate a fuel-air mixture within the second combustion chamber, (iv) the fuel-air mixture is ignited within the second combustion chamber to generate second combustion products, and (v) the second combustion products are provided from the second combustion chamber to the secondary combustion zone of the first combustion chamber via the outlet.

17. The gas turbine engine according to claim 13, wherein the plurality of openings are arranged to generate a swirled flow of the compressor bleed air within the second combustion chamber.

18. The gas turbine engine according to claim 17, wherein the second combustor liner defines a trapped vortex combustor liner, and the swirled flow is a trapped vortex flow of the compressor bleed air within the trapped vortex combustor liner.

19. The gas turbine engine according to claim 17, wherein the second combustor liner defines an axial-flow second combustor liner, and the axial-flow second combustor liner includes a dome having a plurality of dome openings extending through the dome.

20. The gas turbine engine according to claim 19, wherein the plurality of dome openings are arranged at a tangential angle, and the second fuel nozzle is arranged at the tangential angle.

* * * * *